(12) United States Patent
Saiga

(10) Patent No.: US 12,471,765 B2
(45) Date of Patent: Nov. 18, 2025

(54) ENDOSCOPE CONDUIT SWITCHING DEVICE AND ENDOSCOPE

(71) Applicant: OLYMPUS CORPORATION, Tokyo (JP)

(72) Inventor: Kazuya Saiga, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 1005 days.

(21) Appl. No.: 17/097,149

(22) Filed: Nov. 13, 2020

(65) Prior Publication Data
US 2021/0076915 A1 Mar. 18, 2021

Related U.S. Application Data

(63) Continuation of application No. PCT/JP2019/019984, filed on May 20, 2019.

(30) Foreign Application Priority Data

May 21, 2018 (JP) .................................. 2018-097354

(51) Int. Cl.
*A61B 1/018* (2006.01)
*A61B 1/00* (2006.01)

(52) U.S. Cl.
CPC .......... *A61B 1/018* (2013.01); *A61B 1/00094* (2013.01)

(58) Field of Classification Search
CPC . A61B 1/018; A61B 1/00094; A61B 1/00068; A61B 1/00137; A61B 1/015; A61B 8/12; G02B 23/24
See application file for complete search history.

(56) References Cited

U.S. PATENT DOCUMENTS

| 4,800,869 A * | 1/1989 | Nakajima | .......... A61B 1/00068 600/158 |
| 2014/0288372 A1* | 9/2014 | Ando | .......... A61B 1/00068 600/159 |

(Continued)

FOREIGN PATENT DOCUMENTS

| JP | 2007111266 A | * 5/2007 |
| JP | 2015-104425 A | 6/2015 |

(Continued)

OTHER PUBLICATIONS

International Search Report dated Jun. 25, 2019 received in PCT/JP2019/019984.

*Primary Examiner* — Michael J Carey
*Assistant Examiner* — Christen A. Sharpless
(74) *Attorney, Agent, or Firm* — Scully, Scott, Murphy & Presser, P.C.

(57) ABSTRACT

An endoscope conduit switching device includes: a movable piston portion that is movable to be inserted into and removed from a conduit of an endoscope, the movable piston portion including a piston and a packing, the piston being made of resin and extending along a conduit of an endoscope, the piston including a proximal end portion and a small diameter portion thinner than the proximal end portion, the packing being made of an elastic material and being provided on an outer circumference of at least a part of the proximal end portion and on an outer circumference of the small diameter portion, the packing being configured to fill a gap between the piston inserted in the conduit and the conduit.

20 Claims, 16 Drawing Sheets

(56) References Cited

U.S. PATENT DOCUMENTS

| | | | |
|---|---|---|---|
| 2015/0148608 A1* | 5/2015 | Fukushima | A61B 1/00094 |
| | | | 600/116 |
| 2015/0257634 A1* | 9/2015 | Nakade | A61B 1/005 |
| | | | 29/890.12 |
| 2016/0302646 A1* | 10/2016 | Hamazaki | A61B 1/00 |
| 2017/0360278 A1 | 12/2017 | Suzuki et al. | |
| 2019/0125167 A1 | 5/2019 | Taniguchi | |

FOREIGN PATENT DOCUMENTS

| | | |
|---|---|---|
| WO | 2017/145435 A1 | 8/2017 |
| WO | 2018/003185 A1 | 1/2018 |

* cited by examiner

ENDOSCOPE CONDUIT SWITCHING DEVICE AND ENDOSCOPE

CROSS-REFERENCE TO RELATED APPLICATIONS

This application is a continuation of PCT international application Ser. No. PCT/JP2019/019984, filed on May 20, 2019 which designates the United States, incorporated herein by reference, and which claims the benefit of priority from Japanese Patent Applications No. 2018-097354, filed on May 21, 2018, incorporated herein by reference.

BACKGROUND

1. Technical Field

The present disclosure relates to an endoscope conduit switching device and an endoscope.

2. Related Art

In the related art, an ultrasound endoscope has been known that is used for observing the inside of a subject such as a person, with a flexible and elongated insertion portion inserted into the subject and with ultrasound waves transmitted and received by an ultrasound transducer provided on a distal end side of the insertion portion.

When such an ultrasound endoscope is used, is some cases, suction of matters such as liquid inside the body of a subject is performed from a tapered surface provided at the distal end of the insertion portion, and through a channel suction conduit extending between the distal end of the insertion portion and an operating portion provided on a proximal end side of the insertion portion. Furthermore, when such an ultrasound endoscope is used, in some cases, suction of liquid inside a balloon is performed from a balloon water inlet provided at the distal end of the insertion portion and through a balloon suction conduit extending between the operating portion and the distal end of the insertion portion. Switching between these suction conduits is performed by an endoscope conduit switching device provided to the operating portion (see JP 2007-111266 A, for example).

SUMMARY

In some embodiments, an endoscope conduit switching device includes: a movable piston portion that is movable to be inserted into and removed from a conduit of an endoscope, the movable piston portion including a piston and a packing, the piston being made of resin and extending along a conduit of an endoscope, the piston including a proximal end portion and a small diameter portion thinner than the proximal end portion, the packing being made of an elastic material and being provided on an outer circumference of at least a part of the proximal end portion and on an outer circumference of the small diameter portion, the packing being configured to fill a gap between the piston inserted in the conduit and the conduit.

In some embodiments, an endoscope includes: an endoscope body including an insertion portion to be inserted into a subject and an operating portion provided on a proximal end side of the insertion portion; and the endoscope conduit switching device provided to the operating portion of the endoscope body.

The above and other features, advantages and technical and industrial significance of this disclosure will be better understood by reading the following detailed description of presently preferred embodiments of the disclosure, when considered in connection with the accompanying drawings.

DETAILED DESCRIPTION

Figure 1:
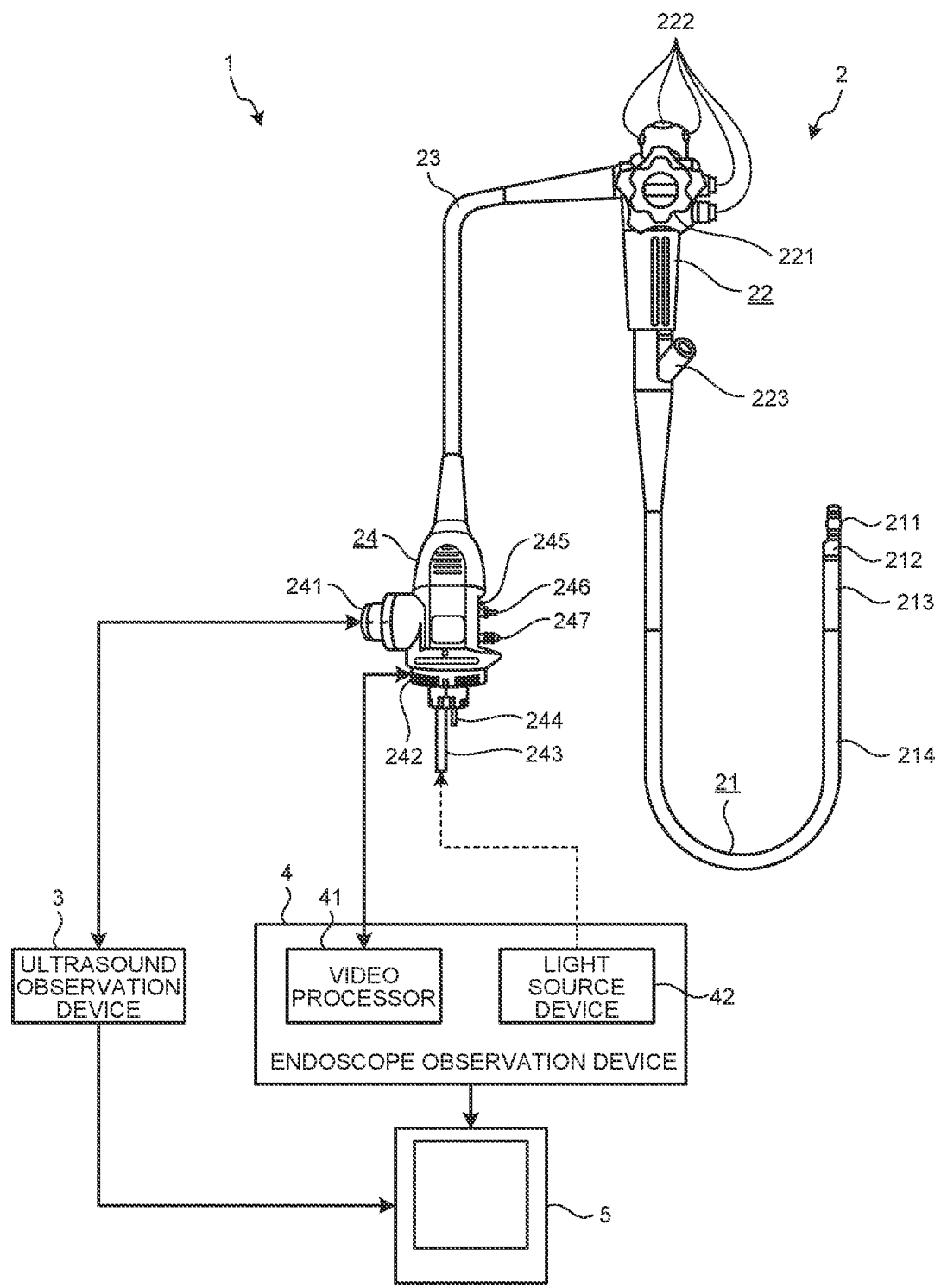
FIG. 1 is a diagram schematically illustrating an endoscope system according to an embodiment of the disclosure.

Hereinafter, embodiments of an endoscope conduit switching device according to the disclosure will be described with reference to the drawings. Note that the disclosure is not limited to these embodiments. The following embodiments are described using a medical endoscope conduit switching device as an example. However, the disclosure can be applied to endoscope conduit switching devices in general including those for medical purposes, for industrial purposes, and the like.

Furthermore, in the drawings, the same or corresponding components are denoted with the same reference numerals as appropriate. It should be noted that the drawings are schematic, and the dimensional relationship between elements, the ratio between elements, and the like may be different from those in the actual configuration. The dimensional relationship between elements and the ratio between elements may even differ among drawings.

Embodiment

FIG. 1 is a diagram schematically illustrating an endoscope system according to an embodiment of the disclosure. An endoscope system 1 illustrated in the figure is a system for performing ultrasound diagnosis in a subject, such as a person, using an ultrasound endoscope. As illustrated in FIG. 1, the endoscope system 1 includes an ultrasound endoscope 2 (endoscope), an ultrasound observation device 3, an endoscope observation device 4, and a display device 5.

The ultrasound endoscope 2 has a function to serve as an endoscope according to the disclosure. This ultrasound endoscope 2 has a part that can be inserted into the subject, and has functions of: transmitting ultrasound pulses to a body wall inside the subject and receiving ultrasound echoes reflected from the subject to output an echo signal; and performing imaging inside the subject to output an image signal. The detailed configuration of the ultrasound endoscope 2 will be described later.

The ultrasound observation device 3 is electrically connected to the ultrasound endoscope 2 through an ultrasound cable 31 provided therebetween, and through ultrasound cable 31, outputs a pulse signal to the ultrasound endoscope 2 and receives the echo signal from the ultrasound endoscope 2. Then, the ultrasound observation device 3 executes predetermined processing on the echo signal to generate the ultrasound image.

An endoscope connector 24 (to be described later) of the ultrasound endoscope 2 is detachably connected to the endoscope observation device 4. As illustrated in FIG. 1, the endoscope observation device 4 includes a video processor 41 and a light source device 42.

The video processor 41 receives the image signal from the ultrasound endoscope 2 via the endoscope connector 24. Then, the video processor 41 executes predetermined processing on the image signal to generate an endoscopic image.

The light source device 42 supplies illumination light, for illuminating the inside of the subject, to the ultrasound endoscope 2 via the endoscope connector 24.

The display device 5 is configured using a liquid crystal or organic electro luminescence (EL), and displays the ultrasound image generated by the ultrasound observation device 3, the endoscopic image generated by the endoscope observation device 4, and the like.

Next, a configuration of the ultrasound endoscope 2 will be described with reference to FIGS. 1 to 5. As illustrated in FIG. 1, the ultrasound endoscope 2 includes an insertion portion 21, an operating portion 22, a universal cable 23, and the endoscope connector 24. In should be noted that the "distal end side" described below means the distal end side of the insertion portion 21 (the distal end side in an insertion direction into the subject). The "proximal end side" described below means the side away from the distal end of the insertion portion 21.

The insertion portion 21 is a portion to be inserted into the subject. As illustrated in FIG. 1, the insertion portion 21 includes: an ultrasound probe 211 provided on the distal end side; a rigid member 212 continuously provided on the proximal end side of the ultrasound probe 211; a bending portion 213 that is coupled to the proximal end side of the rigid member 212 and can be bent; and a flexible conduit portion 214 that is coupled to the proximal end side of the bending portion 213 and has flexibility.

In the insertion portion 21, the operating portion 22, the universal cable 23, and the endoscope connector 24, a light guide (not illustrated) for transmitting the illumination light supplied from the light source device 42, and a plurality of signal cables (not illustrated) for transmitting the pulse signal, the echo signal, and the image signal described above are routed. The detailed configuration of the distal end side of the insertion portion 21 (the ultrasound probe 211 and the rigid member 212) will be described later.

The operating portion 22 is a unit that is connected to the proximal end side of the insertion portion 21 and receives various operations from a physician or the like. As illustrated in FIG. 1, the operating portion 22 includes a bending knob 221 for bending the bending portion 213, and a plurality of operation members 222 for performing various operations.

Figure 3:
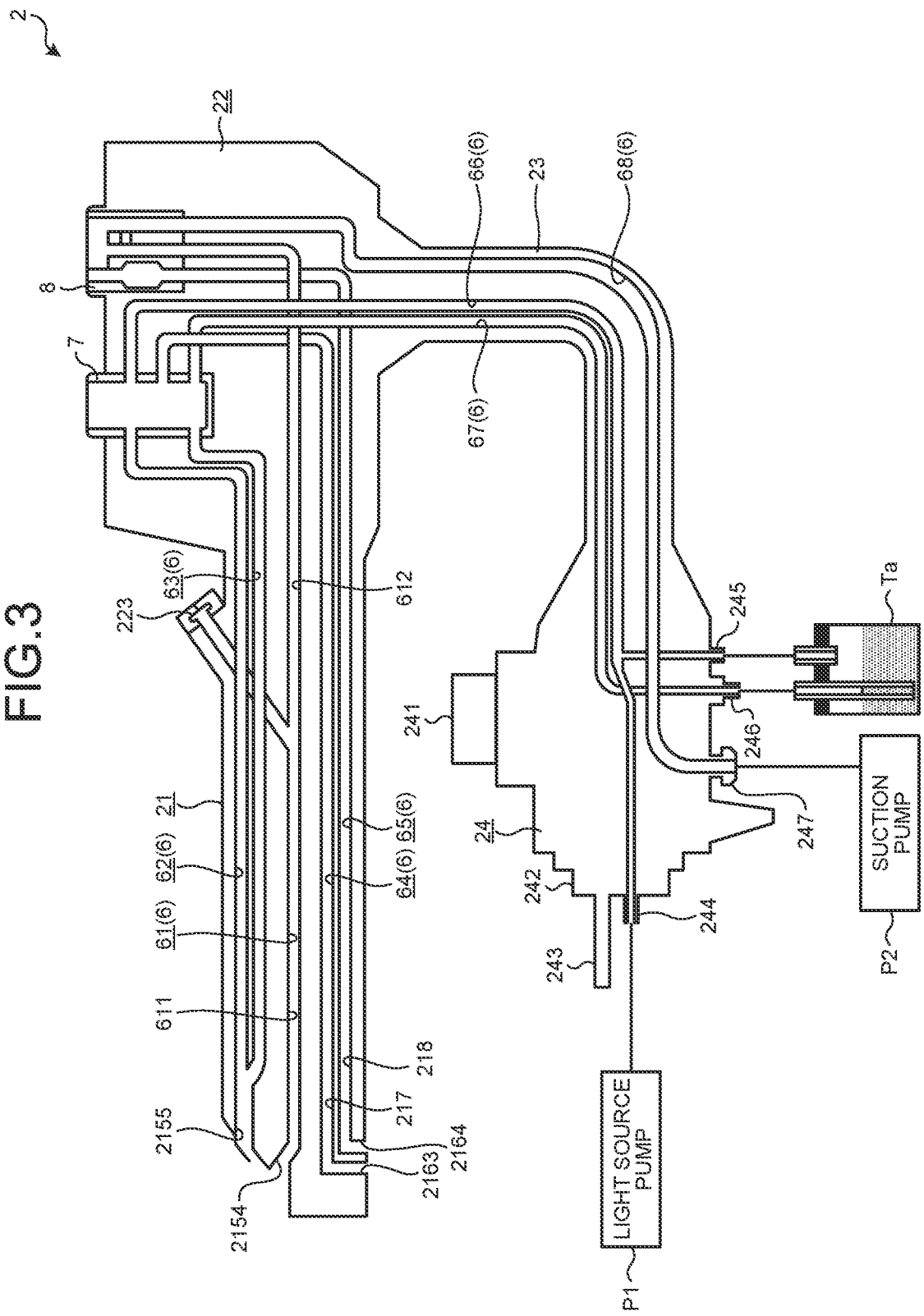
FIG. 3 is a diagram schematically illustrating a plurality of conduits provided in an ultrasound endoscope.

Here, the insertion portion 21 and the operating portion 22 are provided with first to fifth distal end side conduits 61 to 65 (see FIG. 3). Furthermore, the operating portion 22 is provided with an air/water supply, cylinder 7 and a suction cylinder 6 (see FIG. 6) in communication with the first to the fifth distal end side conduits 61 to 65. Furthermore, the air/water supply cylinder 7 and the suction cylinder 6 are respectively provided with an air/water supply button 9 and a suction button 10 FIG. 8 and the like) that are parts of the plurality of operation members 222, and serve as an endoscope conduit switching device. Upon being operated by a physician or the like, the endoscope conduit switching device switches a connection state between the first to fifth distal end side conduits 61 to 65 and first to third proximal end side conduits 66 to 68 described later (see FIG. 3). The suction button 10 corresponds to the endoscope conduit switching device according to the disclosure. The detailed configuration of a plurality of conduits 6 will be described later. The connection state of the plurality of conduits 6 corresponding to the operation on the suction button 10 will also be described later. The air/water supply cylinder 7 and the air/water supply button 9 may have known structures (see, for example, JP 2007-111266 A). Thus, in the following, the connection state of the plurality of conduits 6 corresponding to the operation on the air/water supply button 9 will be described with reference to FIG. 10 and the like with a detailed description on the structure of the air/water supply cylinder 7 and the air/water supply button 9 omitted.

The universal cable 23 is a cable that extends from the operating portion 22 and is provided with the above-mentioned light guide (not illustrated) and the plurality of signal cables (not illustrated).

The endoscope connector 24 is provided at an end portion of the universal cable 23. The endoscope connector 24 includes an ultrasound connector 241 to which the ultrasound cable (not illustrated) is connected and a plug portion 242 that is inserted into the endoscope observation device 4 and is connected to the video processor 41 and the light source device 42.

The operating portion 22, the universal cable 23, and the endoscope connector 24 are provided with the first to the third proximal end side conduits 66 to 68 (see FIG. 3) in communication with the air/water supply cylinder 7 and the suction cylinder 8 provided to the operating portion 22.

Furthermore, the plug portion 242 is provided with a plurality of electric contacts (not illustrated), a light guide connector 243, and an supply connector 244. The plurality of electrical contacts are portions that are electrically connected to the video processor 41 when the endoscope connector 24 is inserted into the endoscope observation device 4.

The light guide connector 243 is a portion into which an incident end side of the light guide (not illustrated) described above is inserted, and optically connects the light guide and the light source device 42 to each other, when the endoscope connector 24 is inserted into the endoscope observation device 4.

The air supply connector 244 is a portion connected to a light source pump 21 (see FIG. 3) provided inside the light source device 42 when the endoscope connector 24 is inserted into the endoscope observation device 4.

Furthermore, the endoscope connector 24 is provided with a pressurization connector 245 and a water supply connector 246 each connected to an external water supply tank Ta (see FIG. 3), as well as a suction connector 247 connected to an external suction pump 22 (see FIG. 3).

Figure 2:
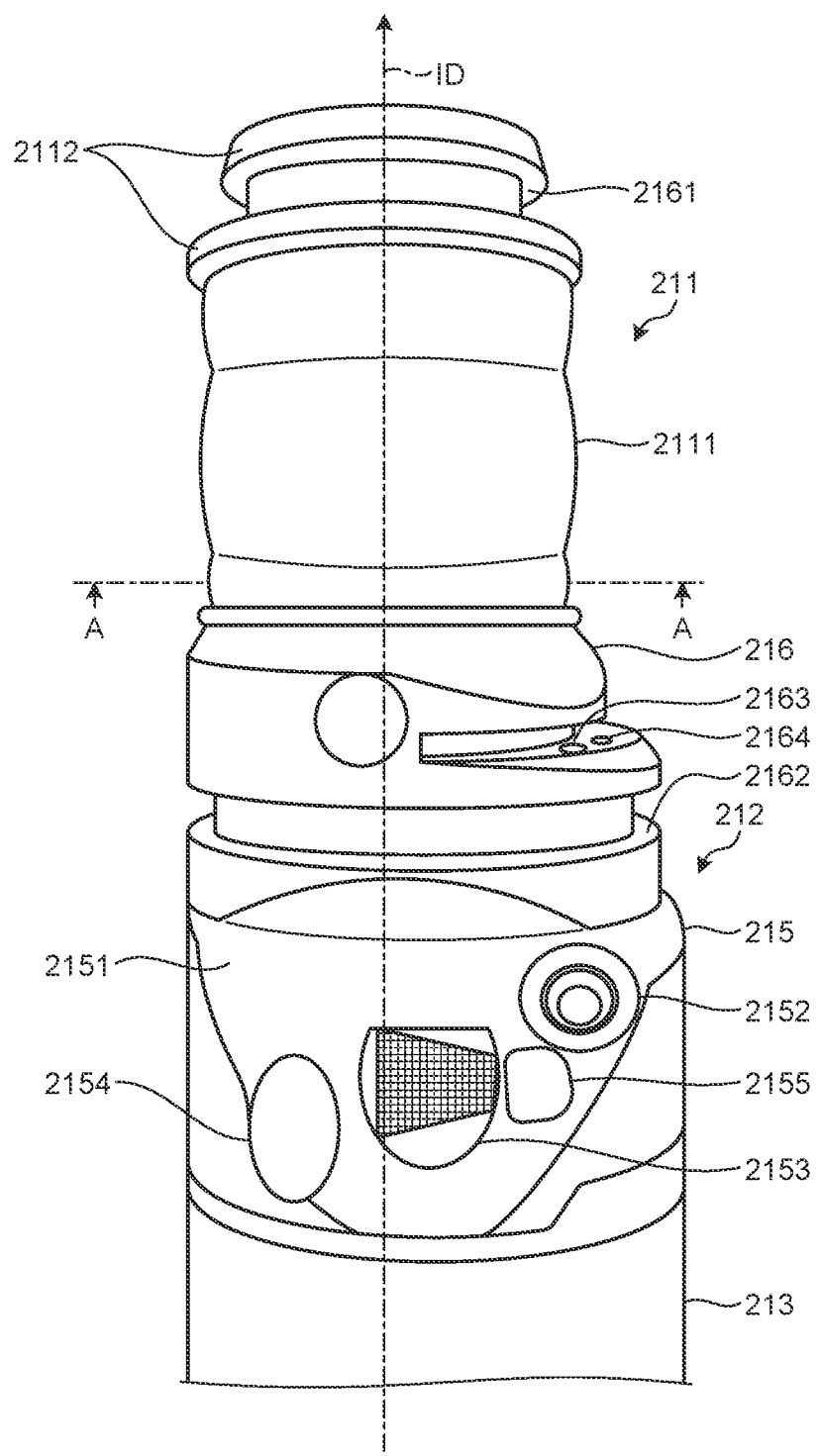
FIG. 2 as an enlarged view of a distal end side of an insertion portion.

FIG. 2 is an enlarged view of the distal end side of the insertion portion. Hereinafter, the configurations of the ultrasound probe 211 and the rigid member 212 will be described in this order with reference to FIG. 2.

The ultrasound probe 211 includes a transducer unit 2111 in which a plurality of ultrasound transducers are regularly arranged, and a distal end portion 2112 made of a metal material or a resin material. A balloon attachment groove 2161 for attaching an inflatable balloon (not illustrated) filled with water is formed on the outer circumference of the distal end portion 2112.

Figure 4:
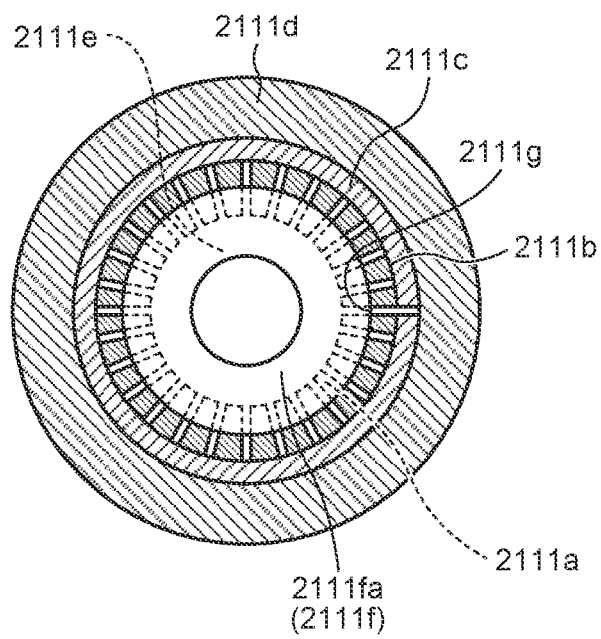
FIG. 4 is a diagram illustrating a configuration of an ultrasound probe according to the embodiment of the disclosure.
Figure 5:
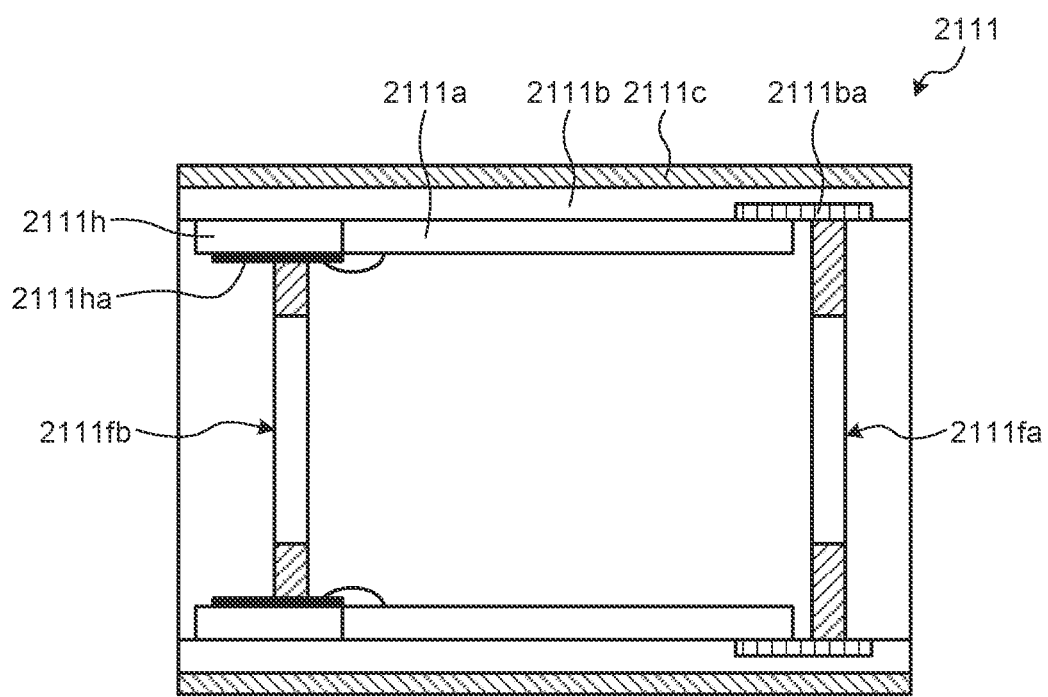
FIG. 5 is a diagram illustrating a configuration of the ultrasound probe according to the embodiment of the disclosure.

FIGS. 4 and 5 are diagrams illustrating the configuration of the ultrasound probe according to the embodiment of the disclosure. FIG. 4 is a cross-sectional view corresponding to line A-A in FIG. 2. FIG. 5 is a cross-sectional view of the transducer unit 2111 taken. along the longitudinal direction of the insertion portion 21. As illustrated in FIGS. 4 and 5, the ultrasound probe 211 includes: a plurality of piezoelectric elements 2111a that have a columnar shape and are arranged along a circumferential direction with their longitudinal direction aligned; a plurality of first acoustic matching layers 2111b that are provide on an inner circumferential surface side of the respective piezoelectric elements 2111a; a second acoustic matching layer 2111c that has a substantially cylindrical shape and is provided on a side (outer surface side) of the first acoustic matching layers 2111b opposite to the side to be in contact with the piezoelectric elements 2111a; an acoustic lens 2111d that is provided on a side of the second acoustic matching layer 2111c opposite to the side to be in contact with the first acoustic matching layers 2111b; a backing material 2111e provided on a side of the piezoelectric elements 2111a opposite to the side to be in contact with the first acoustic matching layers 2111b; a structural member 2111f that has a hollow cylindrical shape for maintaining the shape of the ultrasound probe 211; a joint portion 2111g connecting the first acoustic matching layers 2111b and the second acoustic matching layer 2111c to each other; and substrates 2111h (see FIG. 5) electrically connected to the plurality of piezoelectric elements 2111a. In the present embodiment, the first acoustic matching layer 2111h is provided for each piezoelectric element 2111a, and the second acoustic matching layer 2111c and the acoustic lens 2111d collectively cover the plurality of piezoelectric elements 2111a and the first acoustic matching layers 2111b. Furthermore, the present embodiment adopts a configuration in which the backing material 2111e fills the inner side of the piezoelectric element 2111a. The ultrasound probe 211 may have one piezoelectric element 2111a as a unit of output, or may have a plurality of piezoelectric elements 2111a as a unit of output.

The ultrasound probe 211 is made as follows. Specifically, the sheet shaped second acoustic matching layer 2111c provided with the plurality of piezoelectric elements 2111a and the first acoustic matching layers 2111b is rolled to be in a cylindrical shape with the piezoelectric elements 2111a on the inner circumferential side. The structural member 21111 is provided. Then, adhesion is performed with adhesive applied to a gap formed between both end portions in the arrangement direction of the first acoustic matching layers 2111b and the piezoelectric elements 2111a of the second acoustic matching layer 2111c. Grooves between the piezoelectric elements 2111a and the first acoustic matching layers 2111b are filled with adhesive (not illustrated). The backing material 2111e is provided on the inner side of the piezoelectric elements 2111a.

The piezoelectric elements 2111a convert an electric pulse signal into ultrasound pulses (acoustic pulses) and irradiate the subject with the pulses. Furthermore, the piezoelectric elements 2111a convert the ultrasound echoes reflected in the subject into an electric echo signal representing the echo with a voltage change. The piezoelectric element 2111a is formed by using a PZT ceramic material, PMN-PT single crystal, PMN-PZT single crystal, PZN-PT single crystal, PIN-PZN-PT single crystal, or relaxer material. The PMN-PT single crystal is an abbreviation for solid solution of lead magnesium niobate and lead titanate. The PMN-PZT single crystal is an abbreviation for a solid solution of lead magnesium niobate and lead zirconate titanate. The PZN-PT single crystal is an abbreviation for solid solution of lead zinc niobate and lead titanate. The PIN-PZN-PT single crystal is an abbreviation for a solid solution of indium lead niobate, zinc lead niobate, and lead titanate. The relaxer material is a general term for a three-component piezoelectric material in which lead-based composite perovskite, which is a relaxer material, is added to lead zirconate titanate (PZT) for the purpose of increasing the piezoelectric constant and the dielectric constant. The lead-based composite perovskite is expressed as Pb (B1, B2) $O_3$, B1 is magnesium, zinc, indium, or scandium, and B2 is niobium, tantalum, or tungsten. These materials feature an excellent piezoelectric effect. Thus, downsizing can be achieved with the value of electrical impedance set to be low. This is preferable in terms of impedance matching with thin film electrodes provided to the piezoelectric elements 2111a.

The first acoustic matching layers 2111b and the second acoustic matching layer 2111c achieve acoustic impedance matching between the piezoelectric element 2111a and an observation target, so that sound (ultrasound waves) can efficiently pass between the piezoelectric element 2111a and the observation target. The first acoustic matching layers 2111b and the second acoustic matching layer 2111c are made of different materials. In the present embodiment, the description will be given on the configuration including the two types of acoustic matching layers (the first acoustic matching layers 2111b and the second acoustic matching layer 2111c). Still, only one such layer or three or more such layers may be provided depending on the property between the piezoelectric element 2111a and the observation target.

More specifically, the second acoustic matching layer 2111c is made of an epoxy resin mixed with a silicone filler.

The acoustic impedance can be adjusted by changing the compounding ratio of silicone. The acoustic impedance decreases as the amount of silicone increases. The proportion of silicone, which is 1 to 50% for example, is preferably adjusted as appropriate based on the properties of the ultrasound probe 211 and the epoxy resin.

The groove formed between the plurality of piezoelectric elements 2111a and the first acoustic matching layers 2111b is filled with adhesive (not illustrated). The adhesive is an epoxy resin which is a mixture of first particles having a particle size of micron order and second particles having a particle size of nano order. The first particles are, for example, silica. The second particles are, for example, alumina. The adhesive has the first particles and the second particles (for example, 1 to 50%) mixed with the proportion of the first particles being larger than that of the second particles. By blending the first particles, the ultrasound probe 211 is reinforced. By blending the second particles, the viscosity of the adhesive is adjusted, for preventing the adhesive from being attached to unwanted parts during manufacturing.

The acoustic lens 2111d is formed using silicone, polymethylpentene, epoxy resin, polyetherimide, or the like, and has one convex or concave surface to provide a function of focusing the ultrasound waves. The acoustic lens 2111d emits the ultrasound waves that have passed through the acoustic matching layers, or receives the ultrasound echoes from the outside. Furthermore, the acoustic lens 2111d is optional, meaning that the acoustic lens 2111d may not be provided.

The backing material 2111e attenuates unwanted ultrasound vibration due to the operation of the piezoelectric element 2111a. The backing material 2111e is formed using a material having a large attenuation factor in example of such a material includes, epoxy resin in which a filler such as alumina or zirconia is dispersed, or a rubber in which the above-mentioned filler is dispersed.

The structural member 2111f has a hollow disc shape having an outer diameter corresponding to the diameter of the circle formed by the plurality of first acoustic matching layers 2111b. Specifically, as illustrated in FIG. 5, the structural member 2111f includes: a first structural member 2111fa provided on one end side of the second acoustic matching layer 2111c in a direction (longitudinal direction) orthogonal to a plane formed by the circumferential direction; and a second structural member 2111fb provided on the other side of the second acoustic matching layer 2111c in the longitudinal direction. The first structural member 2111fa has a hollow disk shape having an outer diameter corresponding to the diameter of the circle formed by the plurality of first acoustic matching layers 2111b, and has one surface covered with a conductive material such as copper foil. The second structural member 2111fb has a hollow disc shape having an outer diameter corresponding to the diameter of the circle formed by the inner circumferential surfaces of the plurality of substrates 2111h.

The joint portion 2111g is a portion where the sheer, shaped second acoustic matching layer 2111c, on which the plurality of piezoelectric elements 2111a and the first acoustic matching layers 2111b are formed, is joined after being deformed into a cylindrical shape along the arrangement direction of the piezoelectric elements 2111a. The joint portion 2111g is made of the same material as the second acoustic matching layer 2111c. As a result, it is possible to reduce the impact of the joint portion 2111g on the signals transmitted and received by the ultrasound probe 211.

The substrate 2111h is electrically connected to the piezoelectric element 2111a via an electrode 2111ha. The substrate 2111h is fixed to the electrode 2111ha using adhesive (not illustrated). This adhesive is made of the same material as the adhesive filled in the grooves between the piezoelectric elements 2111a and the first acoustic matching layers 2111b. As a result, it is possible to reduce the impact of the joint portion 2111g on the signal transmitted and received by the ultrasound probe 211.

The ultrasound probe 211 having the configuration described above irradiates the observation target with ultrasound waves via the first acoustic matching layers 2111b, the second acoustic matching layer 2111c, and the acoustic lens 2111d, with the piezoelectric elements 2111a vibrating in response to the input of the pulse signal. In this process, the vibration of the piezoelectric elements 2111a is not transmitted to the side of the piezoelectric elements 2111a opposite to the side provided with the first acoustic matching layer 2111b, the second acoustic matching layer 2111c, and the acoustic lens 2111d, because the backing material 2111e attenuates the vibration of the piezoelectric elements 2111a. The ultrasound waves reflected from the observation target are transmitted to the piezoelectric element 2111a via the first acoustic matching layers 2111b, the second acoustic matching layer 2111c, and the acoustic lens 2111d. The transmitted ultrasound waves cause the piezoelectric elements 2111a to vibrate. The piezoelectric elements 2111a convert the vibration into an electric echo signal and outputs the echo signal to the ultrasound observation device 3 via wiring (not illustrated).

The rigid member 212 is a rigid member made of a metal material or a resin material. The rigid member 212 includes a large diameter portion 215 and a small diameter portion 216.

The large diameter portion 215 is a portion to which the bending portion 213 is connected, and has a substantially columnar shape extending along an insertion direction ID of the insertion portion 21. Furthermore, in the large diameter portion 215, a tapered surface 2151 is formed on the upper side so that the diameter of the large diameter portion 215 gradually decreases toward the distal end side. Furthermore, as illustrated in FIG. 2, the large diameter portion 215 has an illumination hole 2152, an imaging hole 2153, an instrument channel 2154, and an air/water supply hole 2155 that are each formed through the large diameter portion 215 from the proximal end to the tapered surface 2151.

The emission end side of the above-described light guide (not illustrated) is inserted in the illumination hole 2152. Then, the illumination light supplied from the light source device 42 is emitted in the subject through the illumination hole 2152.

The imaging hole 2153 incorporates an objective optical system (not illustrated) that collects the light (subject image) emitted from the light source device 42 and reflected in the subject, and an image sensor (not illustrated) for imaging the subject image the corresponding light of which is collected by the object optical system. Then, the image signal obtained by the image sensor is transmitted to the endoscope observation device 4 (video processor 41) through the signal cable (not illustrated) described above.

The instrument channel 2154 is a part of the first distal end side conduit 61.

The air/water supply hole 2155 is a part of the second distal end side conduit 62 and the third distal end side conduit 63.

The small diameter portion 216 has a substantially cylindrical shape (substantially cylindrical shape having an outer diameter dimension smaller than that of the large diameter portion 215) extending along the insertion direction ID of the insertion portion 21, and is integrally formed at the distal end of the large diameter portion 215. A balloon attachment groove 2162 for attaching an inflatable balloon (not illustrated) filled with water is formed on the outer circumference on the proximal end side of the small diameter portion 216. When the balloon is attached, the ultrasound probe 211 is inserted into the balloon through the tip portion of the balloon (the tip portion for allowing deaerated water to flow into the balloon). Then, the tip portion of the balloon is hooked on the balloon attachment groove 2161 and the balloon attachment groove 2162. In this state, the entire ultrasound probe 211 is covered by the balloon.

Furthermore, a balloon water inlet 2163 for injecting a liquid into the balloon is formed in the small diameter portion 216. The balloon water inlet 2163 is a part of the fourth distal end side conduit 64.

Furthermore, the small diameter portion 216 has a balloon suction port 2164 formed for sucking the liquid and the like inside the balloon. The balloon suction port 2164 is a part of the fifth distal end side conduit 65.

Next, the configuration of a plurality of conduits 6 formed in the ultrasound endoscope 2 will be described with reference to FIG. 3. FIG. 3 is a diagram schematically illustrating the plurality of conduits 6 provided in the ultrasound endoscope 2.

As described above, the plurality of conduits 6 include the first to the fifth distal end side conduits 61 to 65 and the first to the third proximal end side conduits 66 to 68.

The first distal end side conduit 61 is a conduit through which the treatment instrument (for example, a puncture needle or the like) projects to the outside from the instrument channel 2154, and is a conduit for sucking the liquid in the subject from the instrument channel 2154. As illustrated in FIG. 3, the first distal end side conduit 61 includes a treatment instrument tube 611 and a suction tube 612.

The treatment instrument tube 611 is routed in the bending portion 213 and the flexible conduit portion 214, and has one end communicating with the instrument channel 2154. The treatment instrument tube 611 communicates with a treatment instrument insertion port 223 provided in the operating portion 22. Thus, the treatment instrument (for example, a puncture needle or the like) is inserted into the treatment instrument tube 611 the treatment instrument insertion port 223 and protrudes to the outside from the instrument channel 2154.

The suction tube 612 is routed in the operating portion 22, has one end communicating with the other end of the treatment instrument tube 611, and has the other end communicating with the suction cylinder 8.

The second distal end side conduit 62 is a conduit for supplying air from the air/water supply hole 2155 toward the imaging hole (not illustrated), is routed in the bending portion 213, the flexible conduit portion 214, and the operating portion 22, has one end communicating with the air/water supply hole 2155, and has the other end communicating with the air/water supply cylinder 7.

The third distal end side conduit 63 is a conduit for supplying water from the air/water supply hole 2155 toward the imaging hole (not illustrated), is routed in the bending portion 213, the flexible conduit portion 214, and the operating portion 22, has one end communicating with the air/water supply hole 2155, and has the other end communicating with the air/water supply cylinder 7.

The fourth distal end side conduit 64 is a conduit for filling the balloon (not illustrated) with water through a water supply hole 217, is routed in the bending portion 213, the flexible conduit portion 214, and the operating portion 22, has one end communicating with the balloon water inlet 2163, and has the other end communicating with the air/water supply cylinder 7.

The fifth distal end side conduit 65 is a conduit for sucking the water in the balloon (not illustrated) through a water suction hole 218, is routed in the bending portion 213, the flexible conduit portion 214, and the operating portion 22, has one end communicating with the balloon suction port 2164, and has the other end communicating with the suction cylinder 8.

The first proximal end side conduit 66 is a conduit for circulating the air, discharged from the light source pump 21, in the air/water supply cylinder 7 and the water supply tank Ta, and is routed in the operating portion 22, the universal cable 23, and the endoscope connector 24. The first proximal end side conduit 66 is branched into two in the endoscope connector 24, to have one ends communicating with the air supply connector 244 and the pressurization connector 245, and to have the other end communicating with the air/water supply cylinder 7.

The second proximal end side conduit 67 is a conduit for circulating the water, discharged from the water supply tank Ta, in the air/water supply cylinder 7, and is routed in the operating portion 22, the universal cable 23, and the endoscope connector 24. Furthermore, the second proximal end side conduit 67 has one end communicating with the water supply connector 246, and has the other end communicating with the air/water supply cylinder 7

The third proximal end side conduit 68 is a conduit for sucking the liquid in the suction cylinder 8, is routed in the operating portion 22, the universal cable 23, and the endoscope connector 24, has one end communicating with the suction connector 247, and has the other end communicating with the suction cylinder 8.

Figure 6:
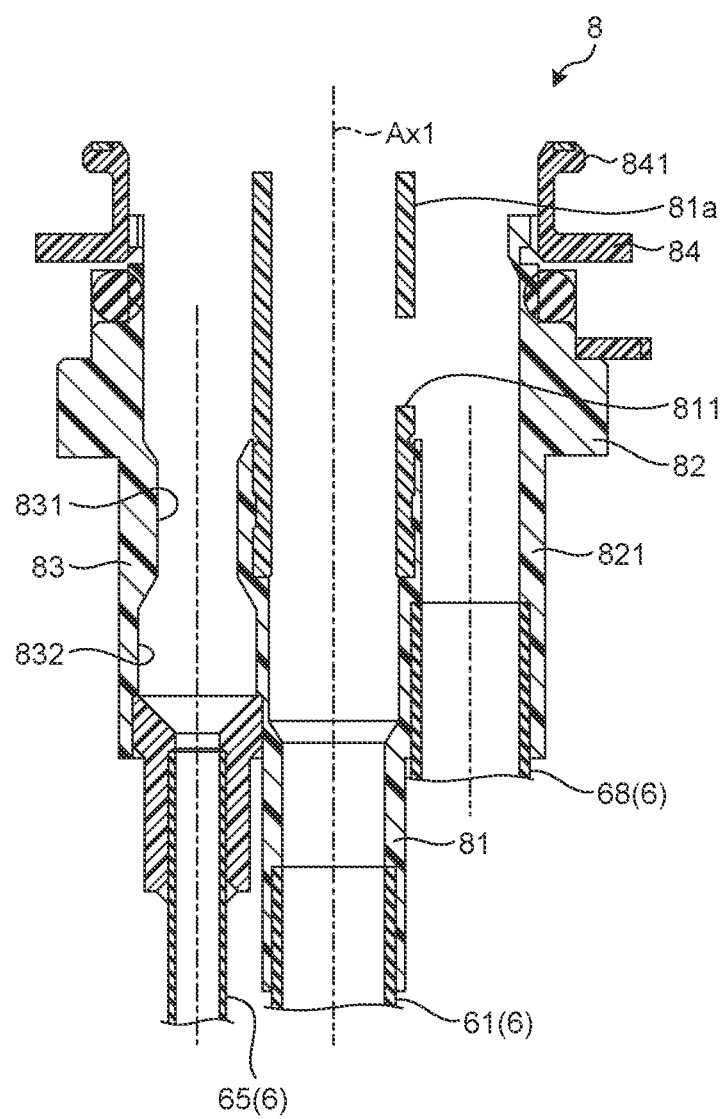
FIG. 6 is a cross-sectional view illustrating a configuration of a suction cylinder.

Next, a configuration of the suction cylinder 8 will be described with reference to FIG. 6. FIG. 6 is a cross-sectional view illustrating a configuration of the suction cylinder. The suction cylinder 8 has a cylindrical shape with a center axis Ax1 extending in the vertical direction in FIG. 6. As illustrated in FIG. 6, the suction cylinder 8 includes a first communication conduit 81 along the center axis Ax1, a tube portion 82 surrounding the outer circumference of the first communication conduit 61, and a third communication conduit 83 that extends in a direction along the renter axis while being separated from the center axis Ax1.

At an upper end portion of the first communication conduit 81, a first communication pipe 81a having an inner diameter enabling a shaft 103 of the suction button 10 described later to be slidably fit, is coaxially and integrally formed with the first communication conduit 81. A communication hole 811 that communicates with the tube portion 82 is formed in the first communication pipe 81a. As illustrated in FIG. 6, the first communication conduit 81 has a lower end portion connected to the other end of the first distal end side conduit 61 via a connector or the like.

As illustrated in FIG. 6, a second communication conduit 821 is formed in a part of the bottom surface of the tube portion 82. The other end of the third proximal end side conduit 68 is connected to the second communication conduit 821. As illustrated in FIG. 6, a connector portion 84 for attaching the suction button 10 is fixed to the upper end of the tube portion 82.

The third communication conduit 83 has a small diameter portion 831 and a large diameter portion 832 in this order from the upper side. As illustrated in FIG. 6, the third communication conduit 83 is connected with the other end of the fifth distal end side conduit 65 via a connector or the like.

The connector portion 84 has a cylindrical shape and is fixed to the outer circumferential surface of the tube portion 82 by, for example, screwing. The connector portion 84 is fixed to the outer circumferential surface of the tube portion 82 while protruding to the outside from the inside of the operating portion 22. As illustrated in FIG. 6, the outer circumferential surface of the connector portion 84 is provided with an engagement protrusion portion 841 that has an annular shape to extend over the entire outer circumferential surface, and project toward the side away from the center axis Ax1 from the upper side of the outer circumferential surface.

Figure 7:
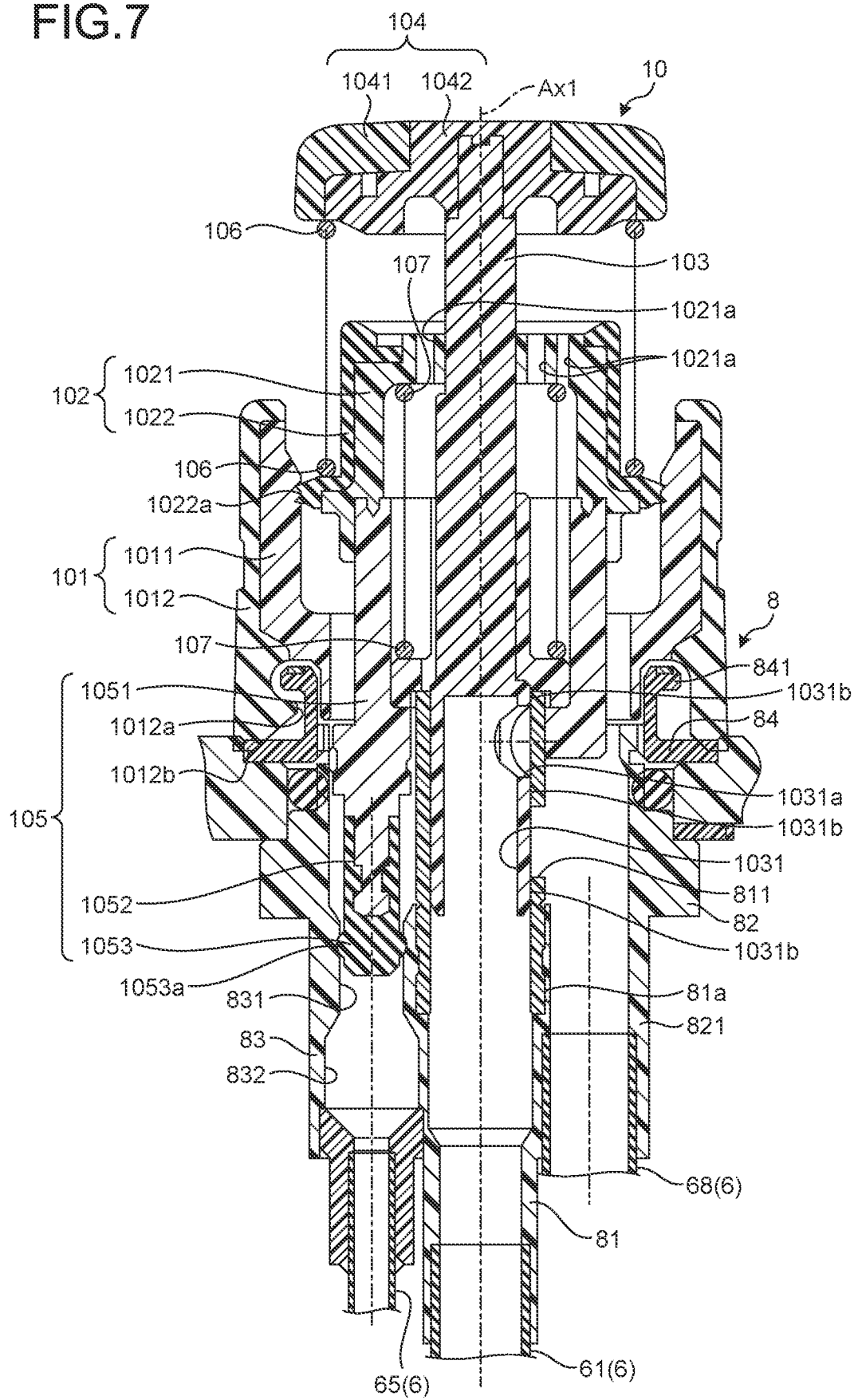
FIG. 7 is a cross-sectional view illustrating a state in which a suction button is attached to the suction cylinder.
Figure 8:
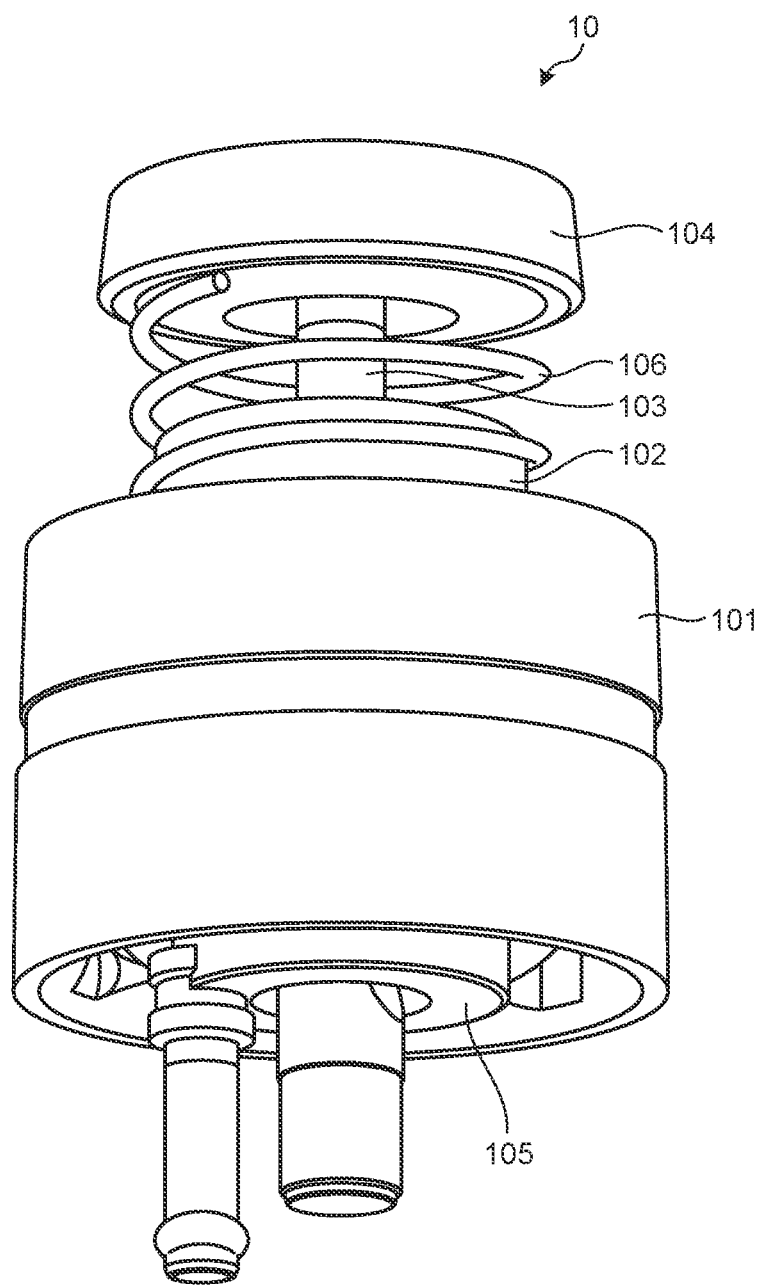
FIG. 8 is a perspective view illustrating configuration of the suction button.
Figure 9:
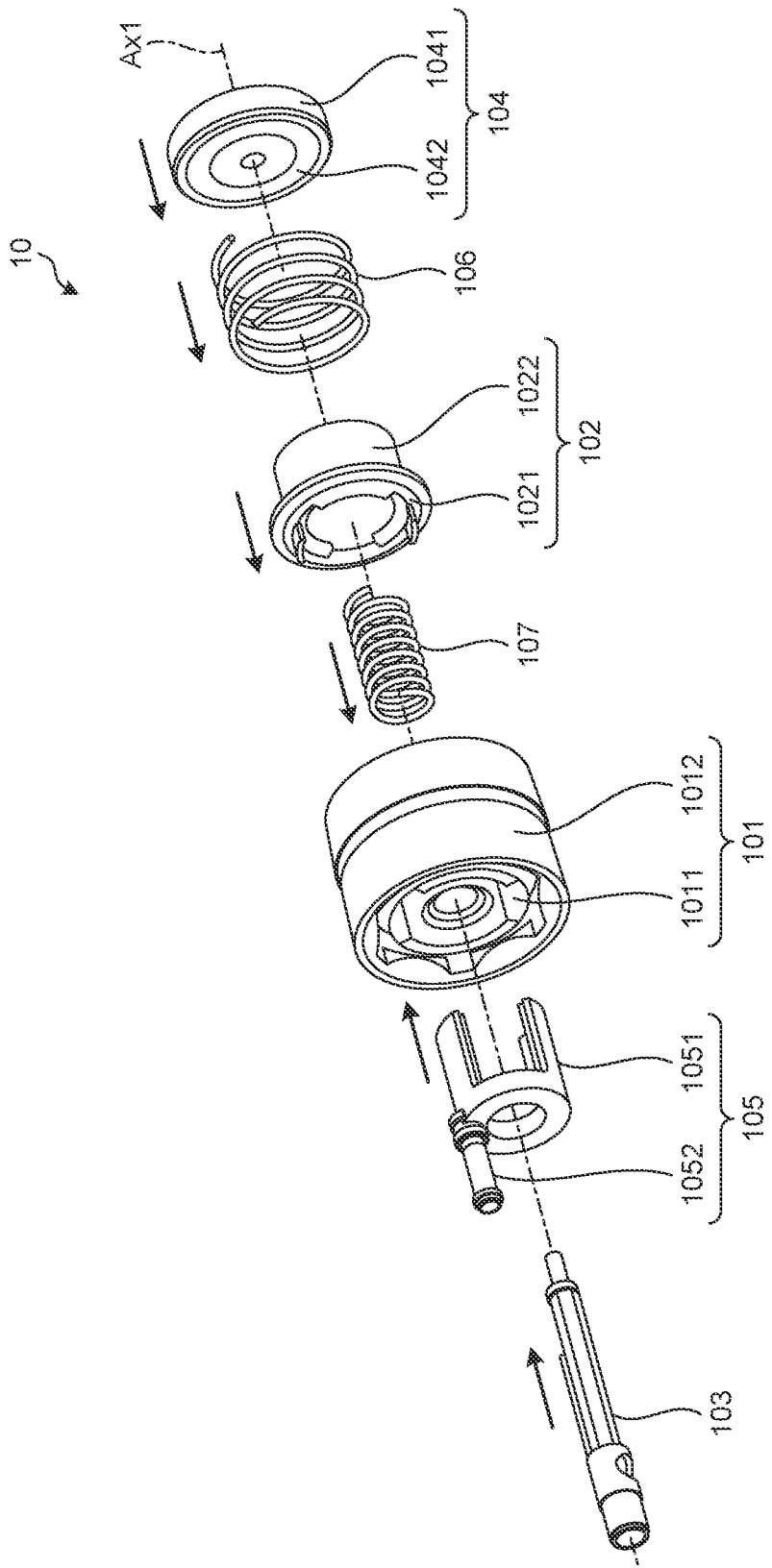
FIG. 9 is a perspective exploded view of the suction button.

Next, a configuration of the suction button 10 will be described with reference to FIGS. 7 to 9. FIG. 7 is a cross-sectional view illustrating a state in which the suction button is attached to the suction cylinder. Specifically, FIG. 7 is a cross-sectional view illustrating a state in which the suction button 10 is attached to the connector portion 84 (suction cylinder 8). Thus, in FIG. 7, the lower side corresponds to the distal end side in a direction of attachment of the suction button 10 to the connector portion 84. FIG. 8 is a perspective view illustrating a configuration of the suction button. FIG. 9 is a perspective exploded view of the suction button.

The suction button 10 includes: an attachment 101 attached to the connector portion 84 (suction cylinder 8); a movable spring bearing 102 movably held by the attachment 101; the shaft 103 movably held by the movable spring bearing 102; a cap 104 fixed to one end of the shaft 103; a movable piston portion 10) fixed to the movable spring bearing 102; a first coil spring 106 that biases the movable spring bearing 102 and the cap 104 in directions away from each other; and a second coil spring 107 that biases the attachment 101 and the movable spring bearing 102 (movable piston portion 105) in directions away from each other. The suction button 10 is provided to the ultrasound endoscope 2 to be replaceable, and is disposable.

The attachment 101 includes a tubular attachment body 1011 made of rigid resin, and an attachment rubber piece 1012 that is made of an elastic material such as rubber, silicone, or a thermoplastic elastomer and covers the outer circumference of the attachment body 1011. At one end of the attachment rubber piece 1012, a claw-shaped attachment connector 1012a is formed. The attachment 101 is fixed to the connector portion 84, with the attachment connector 1012a fitting with the engagement protrusion portion 841 of the connector portion 84. Furthermore, at the end of the attachment rubber piece 1012, a seal portion 1012b is formed that comes into contact with the connector portion 84 to provide sealing between the attachment rubber piece 1012 and the connector portion 84.

The movable spring bearing 102 is joined to the movable piston portion 105 by ultrasound welding, with a part of the attachment 101 and the second coil spring 107 sandwiched in between. The movable spring bearing 102 includes a tubular movable spring bearing body 1021 made of rigid resin, and a movable spring bearing packing 1022 that is made of an elastic material such as rubber, silicone, or a thermoplastic elastomer and covers the outer circumference of the movable spring bearing body 1021. In the bearing packing 1022, a seal portion 1022a that provides slidable sealing between the attachment body 1011 and the bearing packing 1022.

As illustrated in FIG. 9, the shaft 103 extends to be in a substantially rod shape. Furthermore, in the shaft 103, a hole portion 1031 is formed as a hollow space extending in the center axis Ax1 direction. As illustrated in FIG. 7, the hole portion 1031 extends from one end of the shaft 103 along the center axis Ax1 of the shaft 103, and the other end is located inside the shaft 103. The center axis Ax1 passes through the hole portion 1031. Furthermore, in the shaft 103, a communication hole 1031a is formed that establishes communication between a side surface in the direction orthogonal to the center axis Ax1 and the hole portion 1031. Furthermore, the outer circumferential surface of the hole portion 1031 is slidably fitted to the inner circumferential surface of the first communication pipe 81a. With the fitting, a seal portion 1031b providing sealing between the first communication pipe 81a and the hole portion 1031 is formed. The shaft 103 is joined to the cap 104 by ultrasound welding, with a part of the movable spring bearing 102 and the first coil spring 106 sandwiched in between.

The cap 104 receives an operation of moving the movable spring bearing 102 and the movable piston portion 105. The cap 104 includes a hollow disk-shaped first member 1041 and a second member 1042 provided inside the first member 1041. The cap 104 is joined to the shaft 103 by ultrasound welding.

The movable piston portion 105 is movable to be capable of being inserted into and removed from the conduit (the third communication conduit 83) of the ultrasound endoscope 2. The movable piston portion 105 switches between the suction conduits of the ultrasound endoscope 2 in accordance with the insertion into and removal from the conduit (the third communication conduit 83).

The movable piston portion 105 includes: a movable piston portion body 1051 fixed to the movable spring bearing 102; a piston 1052 extending along the conduit. (third communication conduit 83); and a packing 1053 that is arranged on the outer circumference of the piston 1052 and fills a gap between the conduit (third communication conduit 83) and the piston 1052 inserted in the conduit (third communication conduit 83). The movable piston portion body 1051 and the piston 1052 are made of integrally formed rigid resin. The piston 1052 extends at a position different from the center of the cap 104. The packing 1053 is made of an elastic material such as rubber, silicone, or a thermoplastic elastomer, and has a seal portion 1053a formed. The seal portion 1053a provides slidable sealing between the small diameter portion 831 of the third communication conduit 83 and the packing 1053. The detailed configuration of the piston 1052 will be described later.

The first coil spring 106 is formed by spirally winding a wire. The first coil spring 106 is provided between the movable spring bearing 102 and the cap 104, and applies biasing force to these components in directions away from each other. The biasing force applied by the first coil spring 106 is received by the contact surface between the shaft 103 and the attachment 101.

The second coil spring 107 is formed by spirally winding a wire. The second coil spring 107 is provided between the attachment 101 and the movable spring bearing 102, and applies biasing force to these components in directions away from each other. The biasing force applied by the second coil spring 107 is received by the contact surface between the attachment 101 and the movable piston portion 105. The in-use force amount of the second coil spring 107 is larger than the in-use maximum force amount of the first coil spring 106.

In the suction button 10, the second communication. conduit 821 of the ultrasound endoscope 2 communicates with the first communication conduit 81, when the shaft 103 moves with respect to the movable spring bearing 102, in response to an operation on the cap 104. In the suction button 10, the third communication conduit 83 of the ultrasound endoscope 2 communicates with the second communication conduit 821, when the movable piston portion 105 moves with respect to the attachment 101 together with the movable spring bearing 102, in response to an operation on the cap 104. More detailed operation of the suction button 10 will be described later.

Next, how the suction button 10 is assembled will be described. The movable piston portion 105 is fitted from lower side of the attachment 101 (on the left side along the center axis Ax1 in FIG. 9). The attachment 101 and the movable piston portion 105 are fixed to each other so as not to rotate relative to each other about the rotation axis Ax1. Then, the movable spring bearing 102 is attached from the upper side of the attachment 101 (the right side in the center axis Ax1 in FIG. 9) to sandwich the second coil spring 107. The movable spring bearing 102 and the movable piston portion 105 are fixed by ultrasound welding.

Then, the shaft 103 is inserted from the lower side of the movable piston portion 105 that is integrated with the attachment 101 and the like. The attachment 101 and the shaft 103 are fixed to each other so as not to rotate relative to each other about the rotation axis Ax1. Then, the cap 104 is attached from the upper side of the attachment 101 to sandwich the first coil spring 106. The shaft 103 and the cap 104 are fixed by ultrasound welding. Thus, the suction button 10 described above is obtained.

Next, the connection state of the plurality of conduits 6 obtained with the air/water supply button 9 and the suction button 10 will be described with reference to FIGS. 7 and 10 to 15. A case of no operation, a case of closing a leak hole 91 of the air/water supply button 9 with a finger, a case of performing a one step pressing operation, and a case of performing a two step pressing operation are described below in this order.

Case of No Operation

Figure 10:
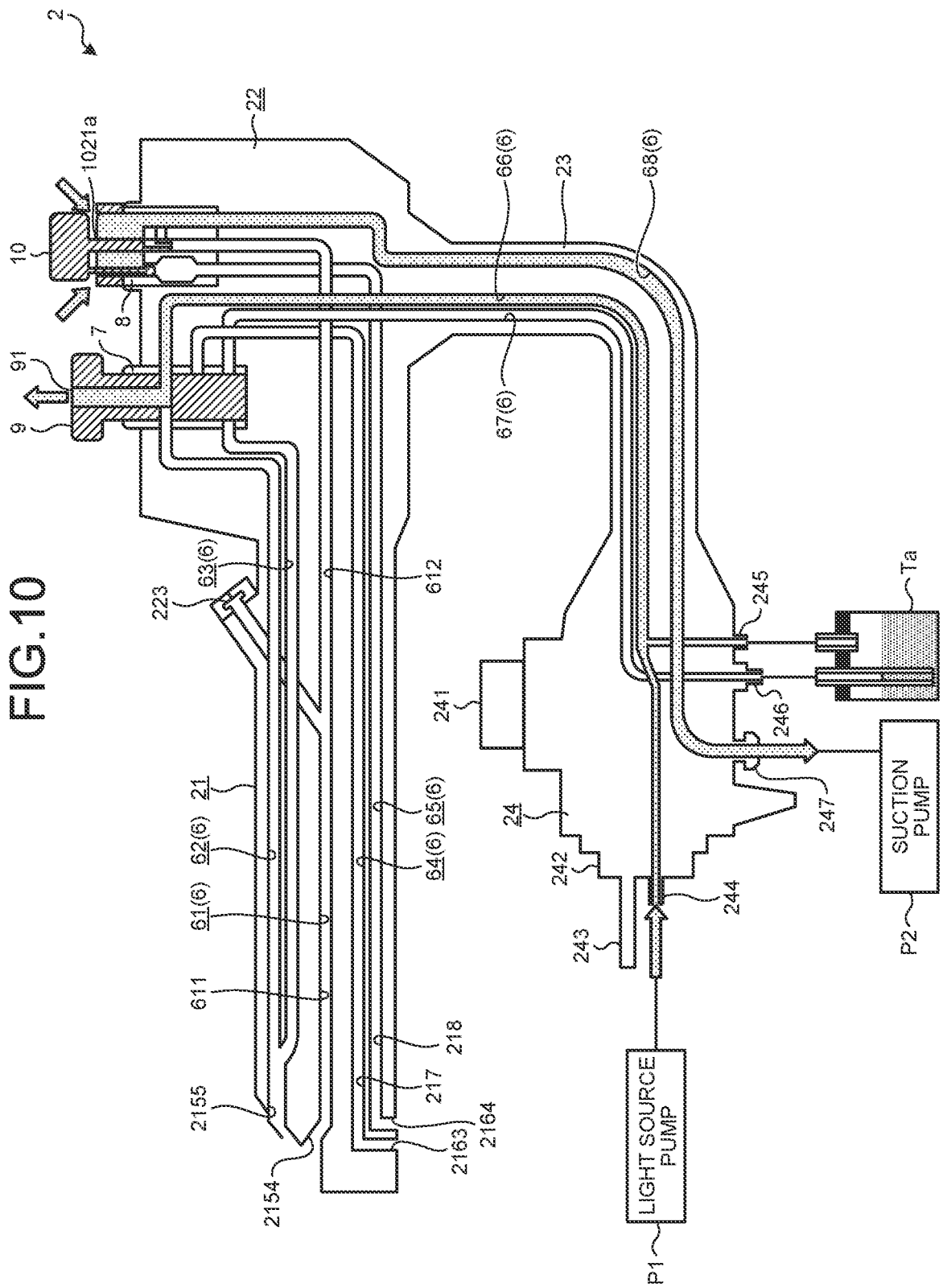
FIG. 10 is a diagram illustrating a connection state of a plurality of conduits in a case where an air/water supply button and the suction button are not operated.

FIG. 7 and FIG. 10 are diagrams illustrating a connection state of a plurality of conduits in a case where the air/water supply button and the suction button are not operated.

When the air/water supply button 9 is not operated, the air discharged from the light source pump P1 flows toward the air/water supply cylinder 7 via the first proximal end side conduit 66. The air flowing toward the air/water supply cylinder 7 passes through the leak hole 91 and is discharged to the outside of the ultrasound endoscope 2.

When the suction button 10 is not operated, the first distal end side conduit 61 is sealed by the seal portion 1031b, and the fifth distal end side conduit 65 is sealed by the seal portion 1053a, On the other hand, for the outside air, the seal portions 1012b and 1022a provide sealing, whereas only a leak hole 1021a is opened. Therefore, when the suction pump P2 is driven, the air outside the ultrasound endoscope 2 flows into the suction cylinder 8 via the leak hole 1021a in the suction button 10, and is sucked by the suction pump P2 through the third proximal end side conduit 68. The opening area of the leak hole 1021a as equal to or larger than the cross-sectional area of the third proximal end side conduit 68. Thus, the suction pressure from the suction pump P2 is prevented from being applied to the first distal end side conduit 61 and the fifth distal end side conduit 65.

Thus, in the case of no operation, the first to the fifth distal end side conduits 61 to 65 and the first to the third proximal end side conduits 66 to 68 are not connected, and none of air supply, water supply, or suction is performed through the distal end of the insertion portion 21.

Case of Closing Leak Hole with Finger

Figure 11:
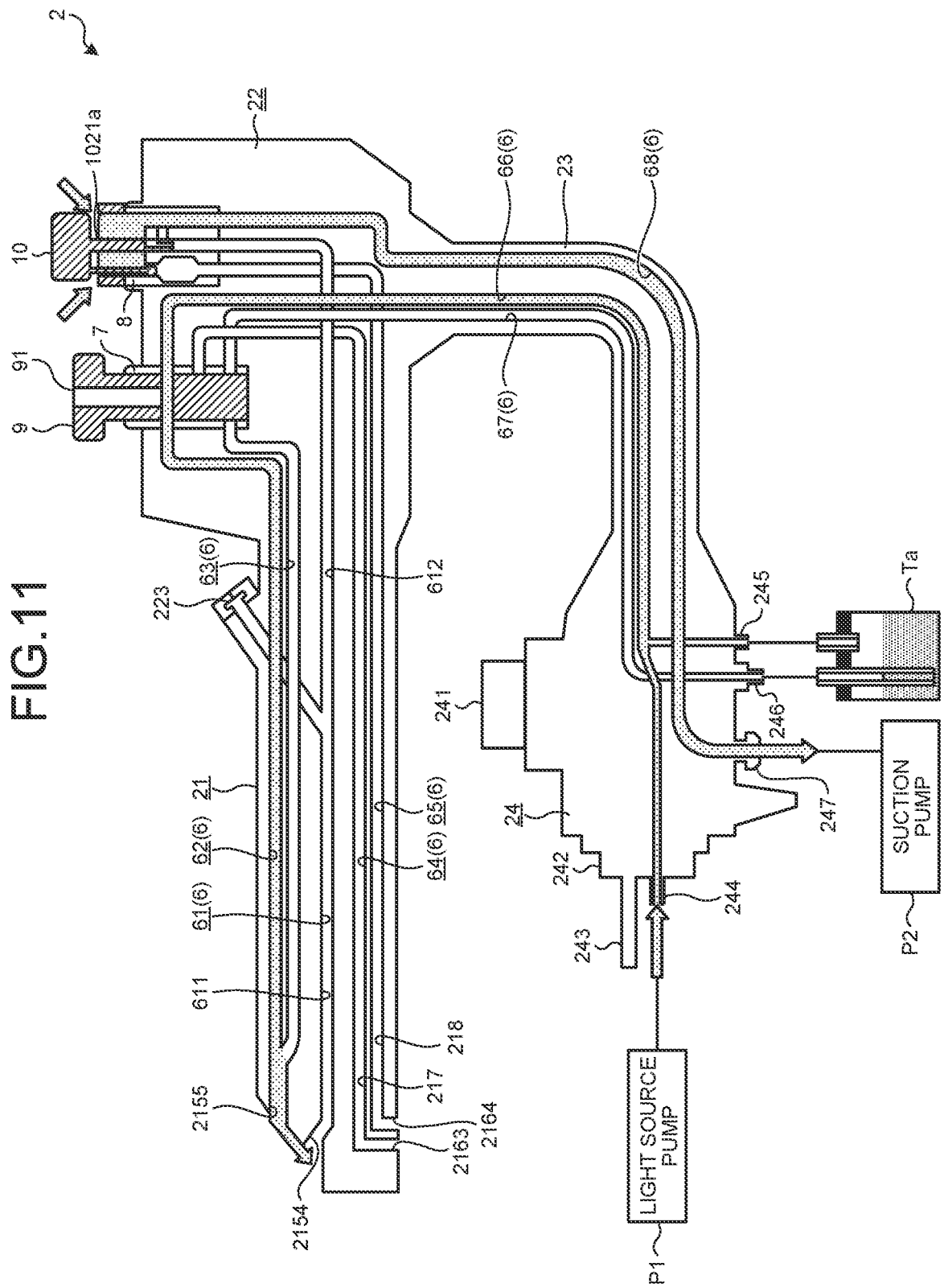
FIG. 11 is a diagram illustrating a connection state of a plurality of conduits in a case where a leak hole of the air/water supply button is closed with a finger.

FIG. 11 is a diagram illustrating a connection state of the plurality of conduits in a case where the leak hole of the air/water supply button is closed with a finger. Note that in FIG. 11, the suction button 10 is not operated at all, as in FIG. 10.

When the leak hole 91 is closed with a finger, the air that has flowed into the air/water supply cylinder 7 flows into the second distal end side conduit 62. Then, as illustrated in FIG. 11, the air that has circulated in the second distal end side conduit 62 is discharged from the air/water supply hole 2155 toward the objective optical system (not illustrated) in the imaging hole (not illustrated).

Case of Performing One Step Pressing Operation

Figure 12:
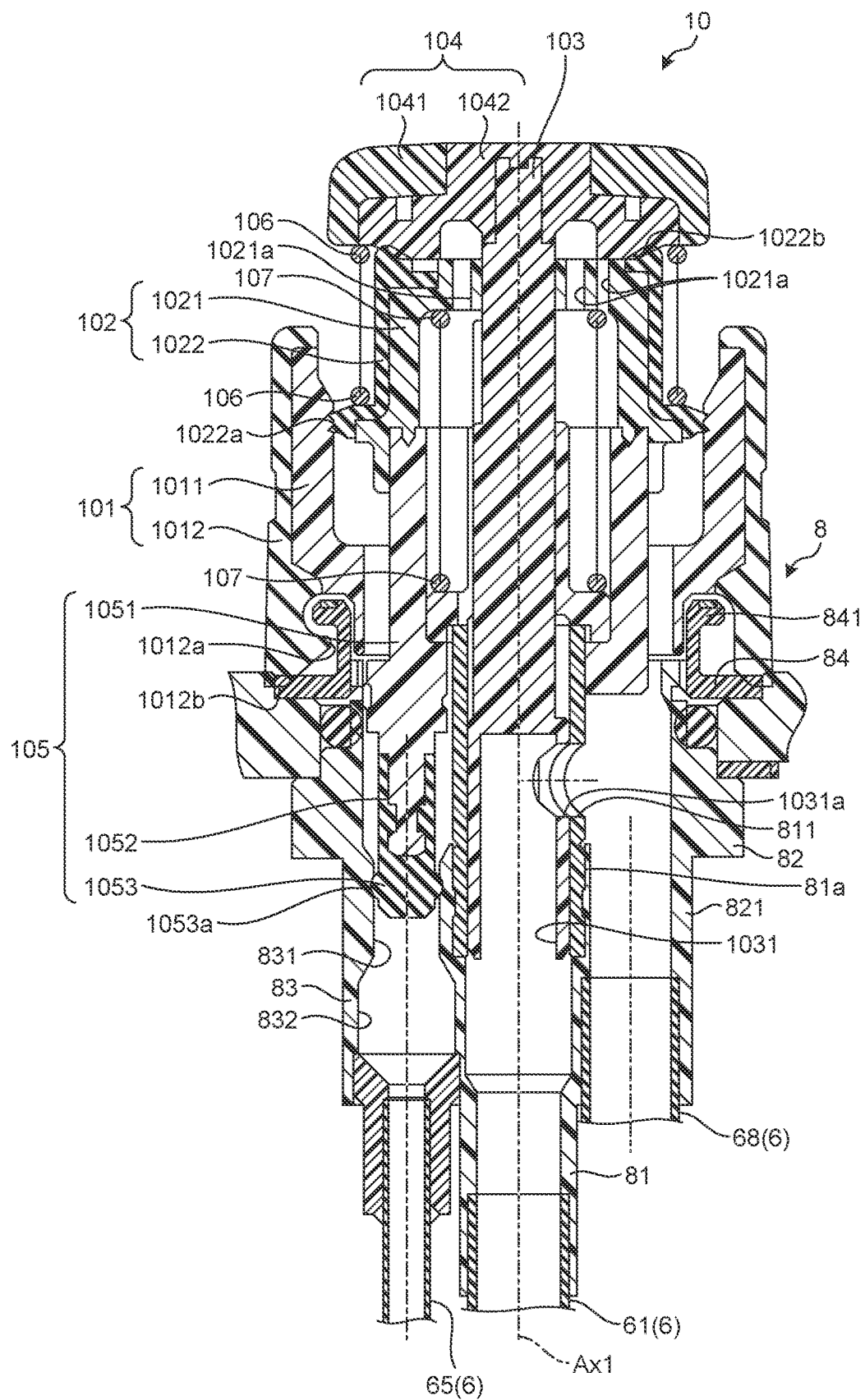
FIG. 12 is a cross-sectional view illustrating a state in which a one step pressing operation is performed on the suction button.
Figure 13:
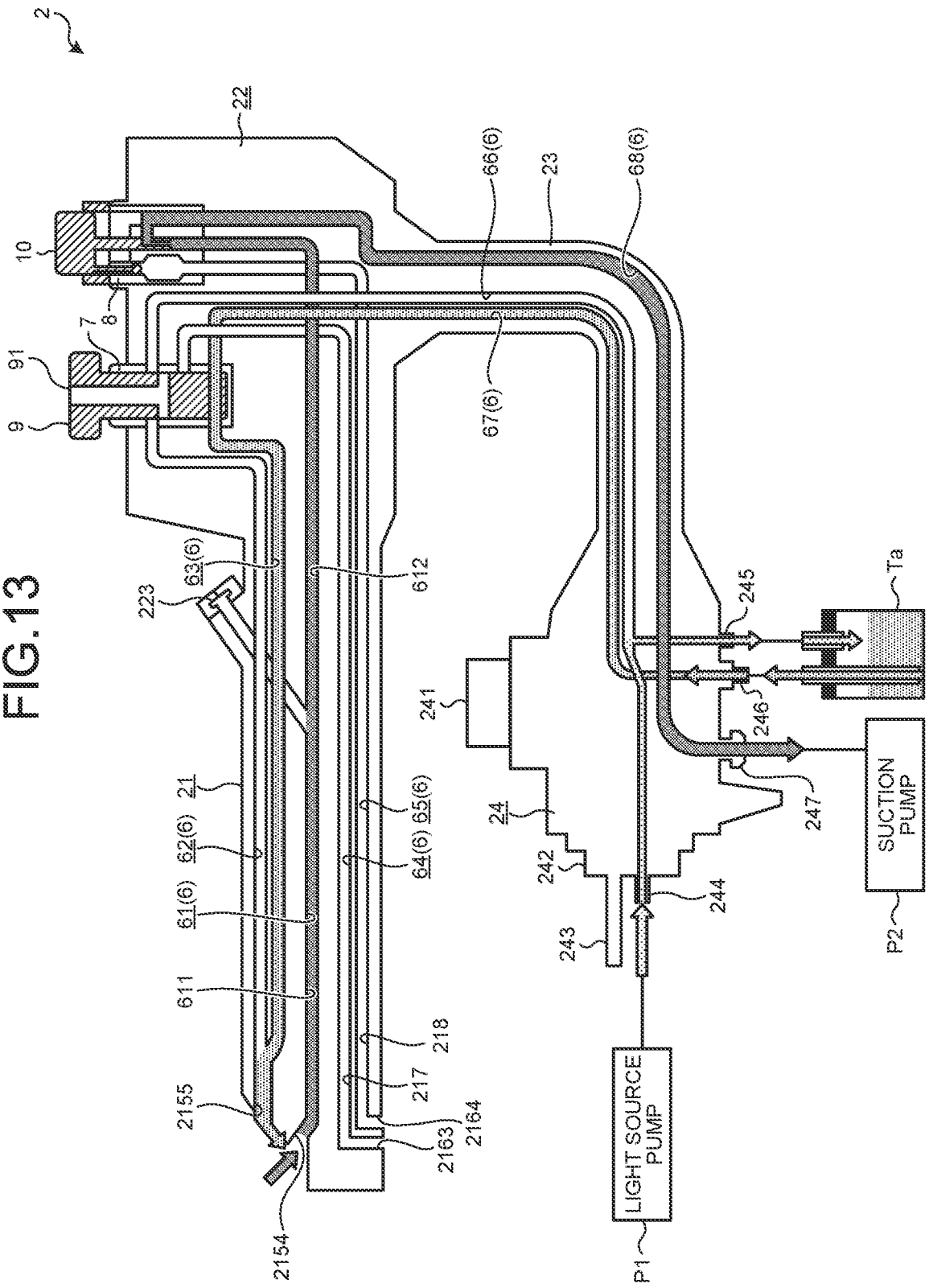
FIG. 13 is a diagram illustrating a connection state of the plurality of conduits in a case where a one step pressing operation is performed on the air/water supply button and the suction button.

FIG. 12 is a cross-sectional view illustrating a state in which a one step pressing operation is performed on the suction button. FIG. 13 is a diagram illustrating a connection state of the plurality of conduits in a case where a one step pressing operation is performed on the air/water supply button and the suction button.

When the one step pressing operation is performed on the air/water supply button 9, as illustrated in FIG. 13, the air discharged from the light source pump P1 enters the water supply tank Ta via the first proximal end side conduit 66, where by the internal pressure of the water supply tank Ta rises, and the water flows out from the water supply tank Ta. Then, the water from the water supply tank Ta flows toward the air/water supply cylinder 7 via the second proximal end side conduit 67. The water flowing toward the air/water supply cylinder 7 flows into the third distal end side conduit 63. Then, the water that has circulated in the third distal end side conduit 63 is discharged from the air/water supply hole 2155 toward the objective optical system (not illustrated) in the imaging hole (not illustrated).

Furthermore, when the one step pressing operation is performed on the suction button 10, as illustrated in FIG. 12, the cap 104 and the movable spring bearing packing 1022 of the movable spring bearing 102 come in contact with each other, and a seal portion 1022b seals the leak hole 1021a. Furthermore, the shaft 103 integrated with the cap 104 by ultrasound welding also slides downward in the first communication pipe 81a. As a result, the communication hole 1031a of the shaft 103 becomes coaxial with the communication hole 811 of the first communication pipe 81a. Then, the fifth distal end side conduit 65 is sealed by the seal portion 1053a, and the seal portions 1012b, 1022a, and 1022b provide sealing for the outside air. On the other hand, the communication hole 1031a of the shaft 103 and the communication hole 811 of the first communication pipe 81a become coaxial (open), whereby the first distal end side conduit 61 and the third proximal end side conduit 68 are connected (communicate). Then, the liquid in the subject flows from the instrument channel 2154 into the first distal end side conduit 61, and is sucked by the suction pump P2 through the suction cylinder 8 and the third proximal end side conduit 68. When the liquid in the subject is sucked from the instrument channel 2154 in this manner, in order to close the treatment instrument insertion port 223 and apply suction pressure to the distal end side (the instrument channel 2154 side), a forceps plug (not illustrated) is attached to the treatment instrument insertion port 223.

Case of Performing Two Step Pressing Operation

Figure 14:
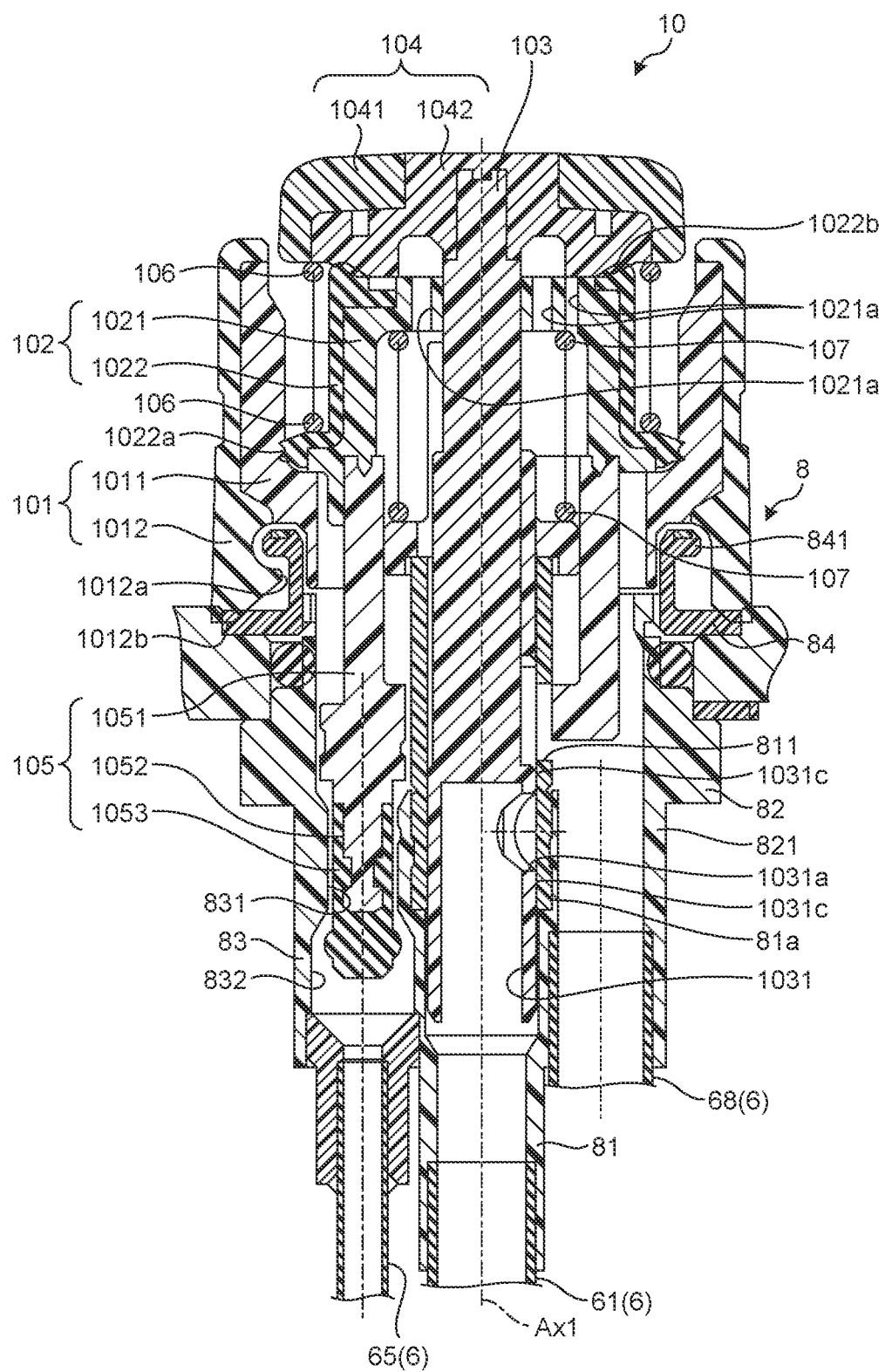
FIG. 14 is a cross-sectional view illustrating a state where a two step pressing operation as performed on the suction button.
Figure 15:
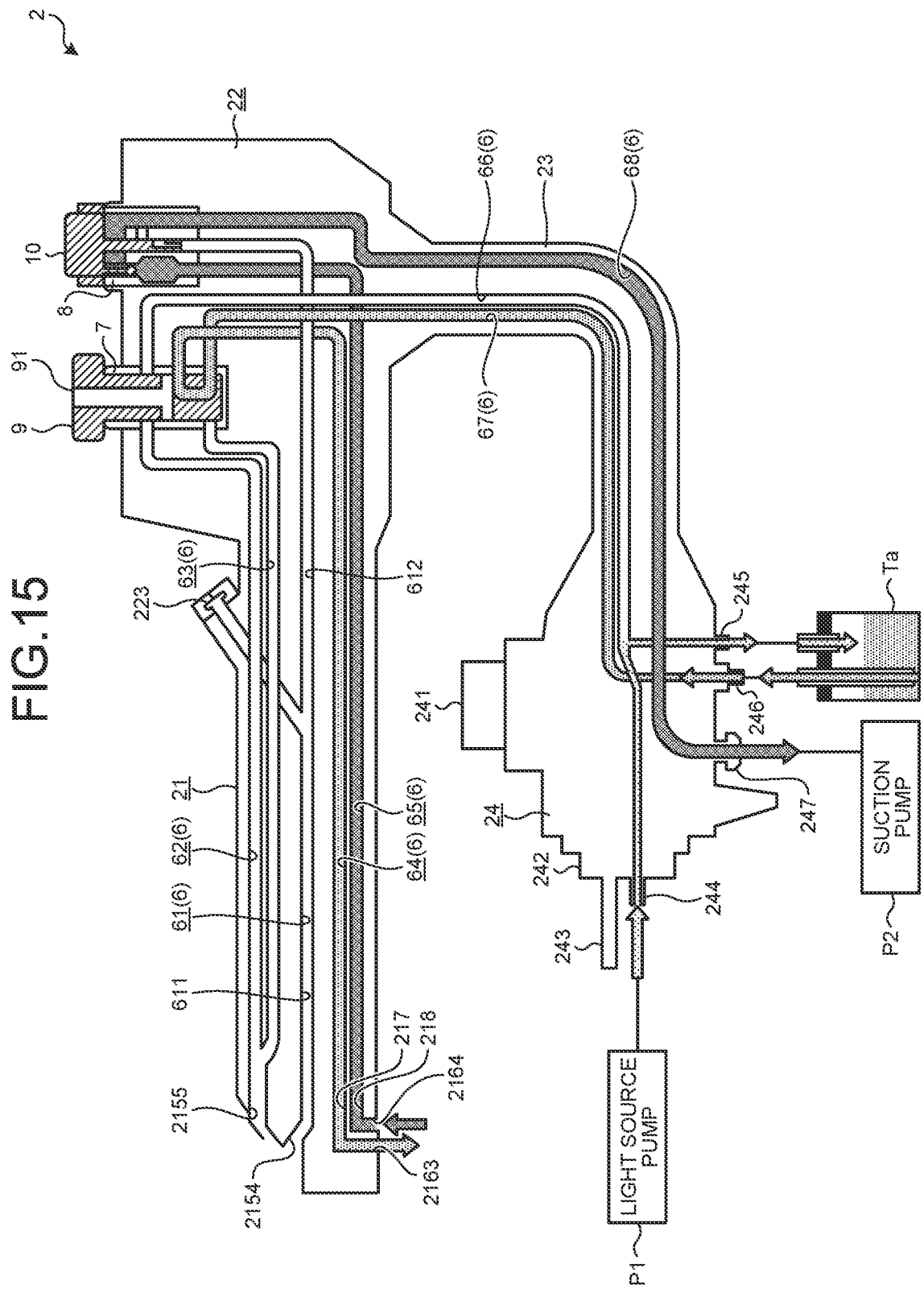
FIG. 15 is a diagram illustrating a connection state of the plurality of conduits in a case where the two step pressing operation is performed on the air/water supply button and the suction button.

FIG. 14 is a cross-sectional view illustrating a state where a two step pressing operation is performed on the suction button. FIG. 15 is a diagram illustrating a connection state of the plurality of conduits in a case where the two step pressing operation is performed on the air/water supply button and the suction button.

When two step pressing operation is performed on the air/water supply button 9 (when another one step pressing operation is performed in the state illustrated in FIG. 13), the water flowing toward the air/water supply cylinder 7 is circulated in the fourth distal end side conduit 64. Then, as illustrated in FIG. 15, the balloon (not illustrated) is filled with the water that has circulated in the fourth distal end side conduit 64, via the water supply hole 217 and the balloon water inlet 2163.

Furthermore, when the two step pressing operation is performed on the suction button 10, as illustrated in FIG. 14, the seal between the cap 104 and the movable spring bearing 102 provided by the seal portion 1022b and the seal between the movable spring bearing 102 and the attachment 101 provided by the seal portion 1022a are maintained, and the shaft 103 and the movable piston portion 105 respectively move downward in the first communication pipe 81a and the third communication conduit 83. Then, sliding fitting between the shaft 103 and the first communication pipe 81a, results in a seal portion 1031c providing sealing between the shaft 103 and the first communication pipe 81a, and the packing 1053 of the movable piston portion 105 from the small diameter portion 831 of the third communication conduit 83 being positioned at the large diameter portion 832. Then, the first distal end side conduit 61 is sealed by the seal portion 1031c, and the seal portions 1012b, 1022a, and 1022b provide sealing for the outside air. Furthermore, with the packing 1053 of the movable piston portion 105 moved to the large diameter portion 832 of the third communication conduit 83, the seal portion 1053a is opened, and the fifth distal end side conduit 65 and the third proximal end side conduit 68 are connected to each other (communicate). Then, the liquid (water in the balloon) in the subject flows from the balloon suction port 2164 into the fifth distal end side conduit 65, and is sucked by the suction pump P2 through the suction cylinder 8 and the third proximal end side conduit 68.

Figure 16:
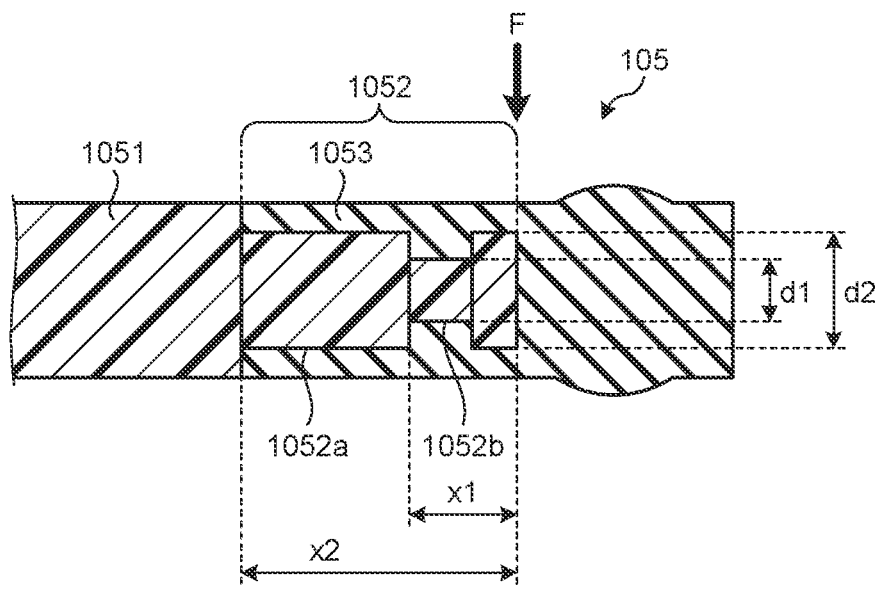
FIG. 16 is an enlarged cross-sectional view of a piston.

Next, a configuration of the piston 1052 will be described. FIG. 16 is an enlarged cross-sectional view of the piston. The piston 1052 has a cylindrical shape with a diameter being differing between a proximal end portion 1052a and a small diameter portion 1052b. The small diameter portion 1052b has a circular cross section with a diameter smaller than that of the proximal end portion 1052a. Still, the cross sections of the proximal end portion 1052a and the small diameter portion 1052b are not limited to the circular shape. The small diameter portion 1052b is located more on the distal end side than the center of the piston 1052 in the direction along the conduit (third communication conduit 83), and the distal end of the piston 1052 has the same thickness as the proximal end portion 1052a. In other words, the small diameter portion 1052b is formed so that the piston 1052 is constricted.

More specifically, the small diameter portion 1052b satisfies $x1/(d1)^3 > x2/(d2)^3$, where $x1$ (mm) represents the length from the most proximal end side portion of the small diameter portion 1052b to the distal end of the piston 1052 in the direction along the conduit (third communication conduit 83), $x2$ (mm) represents the length of the piston 1052, $d1$ (mm) represents the diameter of the small diameter portion 1052b, and $d2$ (mm) represents the diameter of the proximal end portion 1052a.

As illustrated in FIG. 16, a load F(N) is assumed to be applied to the distal end of the piston 1052 in a direction orthogonal to the extending direction of the piston 1052. Under this condition, to enable the proximal end portion 1052a break the small diameter portion 1052b, a bending stress σ1 of the most proximal end side portion of the small diameter portion 1052b may be set to be larger than a bending stress σ2 of the most proximal end side portion of the proximal end portion 1052a. The bending stress a (N/mm²) is calculated by σ=M/Z, where N (N·mm) represents a bending moment and Z(mm³) represents a section modulus.

The bending stress σ1 is $σ1=(32×F/π)×(x1/(d1)^3)$ because $Z1=π(d1)^3/32$ and $M1=F×x1$ hold. The bending stress σ2 is $σ2=(32×F/π)×(x2/(d2)^3)$ because $Z2=π(d2)^3/32$ and $M2=F×x2$ hold. Therefore, in order to satisfy σ1>σ2, $x1/(d1)^3 > x2/(d2)^3$ may be satisfied.

When the piston 1052 is inserted into and removed from the third communication conduit 83, deformation of the packing 1053 may result in application of force to the piston 1052 in a direction orthogonal to the extending direction of the piston 1052. At this time, since $x1/(d1)^3 > x2/(d2)$ is satisfied, the most proximal end side portion of the small diameter portion 1052b breaks. Even if the most proximal end side portion of the small diameter portion 1052b breaks, the packing 1053 and the piston 1052 are prevented from being separated from each other, because the side surface of the proximal end portion 1052a and the packing 1053 are joined to each other. As a result, according to the embodiment, force is applied to the piston 1052 in the direction orthogonal to extending the direction of the piston 1052, and the switching of the conduit (third communication conduit 83) can be continued even after the breaking of the most proximal end side portion of the small diameter portion 1052b.

First Modification

Figure 17:
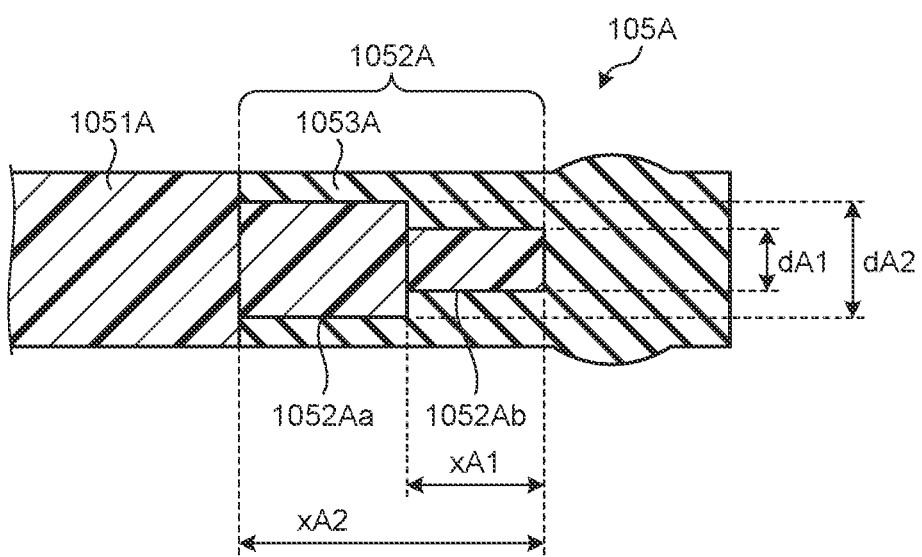
FIG. 17 is an enlarged cross-sectional view of a piston of an endoscope conduit switching device according to a first modification of the embodiment.

FIG. 17 is an enlarged cross-sectional view of a piston of an endoscope conduit switching device according to a first modification of the embodiment. A piston 1052A. extending from a movable piston portion body 1051A of a movable piston portion 105A has a cylindrical shape with a diameter differing between a proximal end portion 1052Aa and a small diameter portion 1052Ab. The small diameter portion 1052Ab has a circular cross section with a diameter smaller than that of the proximal end portion 1052Aa. The small diameter portion 1052Ab is located more on the distal end side than the center of the piston 1052A in the direction along the conduit (third communication conduit 83), and extends to the distal end of the piston 1052A. A packing 1053A is provided on the outer circumference of the piston 1052A.

More specifically, the small diameter portion 1052Ab satisfies $xA1/(dA1)^3 > xA2/(dA2)^3$, where $xA1$ (mm) represents the length from the most proximal end side portion of the small diameter portion 1052Ab to the distal end of the piston 1052A in the direction along the conduit. (third communication conduit 83), $xA2$ (mm) represents the length of the piston 1052A, $dA1$ (mm) represents the diameter of the small diameter portion 1052Ab, and $dA2$ (mm) represents the diameter of the proximal end portion 1052Aa.

According to the first modification, since $xA1/(dA1) > xA2/(dA2)^3$ is satisfied, the packing 1053A and the piston 1052A are prevented from being separated from each other.

Second Modification

Figure 18:
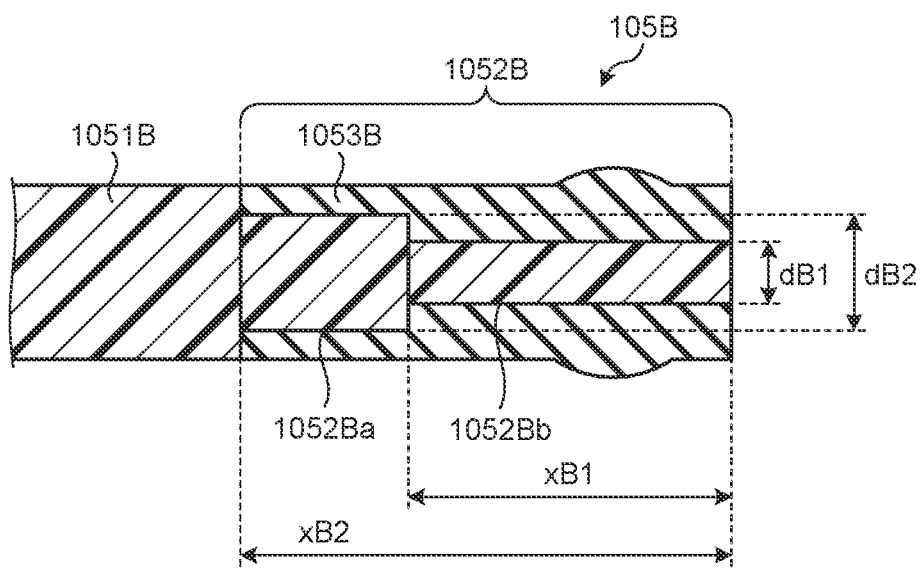
FIG. 18 is an enlarged cross-sectional view of a piston of an endoscope conduit switching device according to a second modification of the embodiment.

FIG. 18 is an enlarged cross-sectional view of a piston of an endoscope conduit switching device according to a second modification of the embodiment. A piston 1052B extending from a movable piston portion body 1051B of a movable piston portion 105B has a cylindrical shape with a diameter differing between a proximal end portion 1052Ba and a small diameter portion 10523b. The small diameter portion 1052Bb has a circular cross section with a diameter smaller than that of the proximal end portion 1052Ba. The small diameter portion 1052Bb extends to the distal end of the piston 1052B in a direction along the conduit (third communication conduit 83), and has a distal end matching the distal end of a packing 1053B. A packing 1053B is provided on the outer circumference of the piston 1052B.

More specifically, the small diameter portion 10523b satisfies $xB1/(dB1)^3 > xB2/(dB2)^3$, where xB1 (mm) represents the length from the most proximal end side portion of the small diameter portion 1052Bb to the distal end of the piston 1052B in the direction along the conduit (third communication conduit 83), xB2 (mm) represents the length of the piston 1052B, dB1 (mm) represents the diameter of the small diameter portion 1052Bb, and dB2 (mm) represents the diameter of the proximal end portion 1052Ba.

According to the second modification, since $xB1/(dB1)^3 > xB2/(dB2)^3$ is satisfied, the packing 10533 and the piston 1052B are prevented from being separated from each other.

Third Modification

Figure 19:
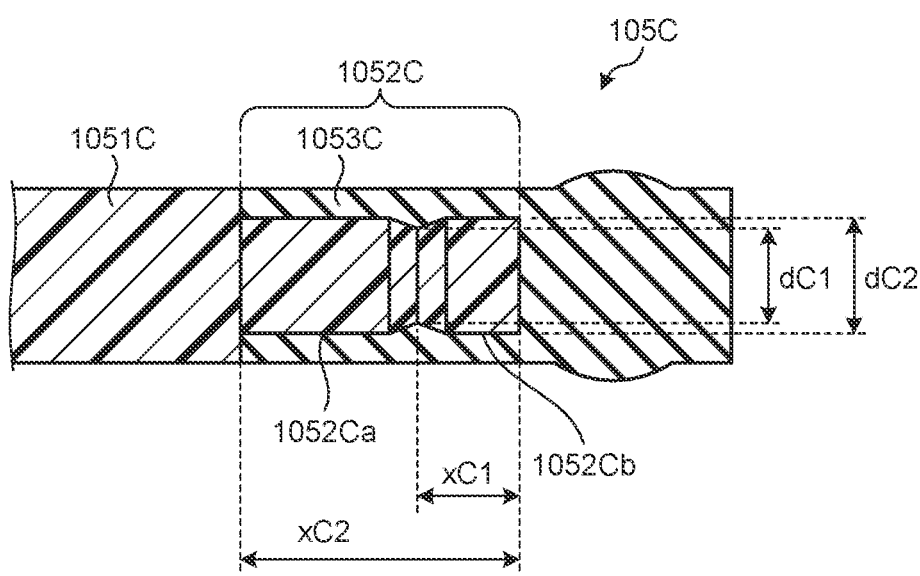
FIG. 19 is an enlarged cross-sectional view of a piston of an endoscope conduit switching device according to a third modification of the embodiment.

FIG. 19 is an enlarged cross-sectional view of a piston of an endoscope conduit switching device according to a third modification of the embodiment. A piston 1052C extending from a movable piston portion body 1051C of a movable piston portion 105C has a cylindrical shape with a diameter differing between a proximal end portion 1052Ca. and a small diameter portion 1052Cb. The small diameter portion 1052Cb has a circular cross section with a diameter smaller than that of the proximal end portion 1052Ca. The small diameter portion 1052Cb is located more on the distal end side than the center of the piston 1052C in the direction along the conduit (third communication conduit 83), and the distal end of the piston 1052C has the same length as the proximal end portion 1052Ca. In other words, the small diameter portion 1052Cb is formed so that the piston 1052C is constricted in a tapered form. A packing 1053C is provided on the outer circumference of the piston 1052C.

More specifically, the small diameter portion 1052Cb satisfies $xC1/(dC1)^3 > xC2/(dC2)^3$, where xC1 (mm) represents the length from the most proximal end side portion of the small diameter portion 1052Cb to the distal end of the piston 1052C in the direction along the conduit (third communication conduit 83) , xC2 (mm) represents the length of the piston 1052C, dC1 (mm) represents the diameter of the small diameter portion 1052Cb, and dC2 (ram) represents the diameter of the proximal end portion 1052Ca.

According to the third modification, since $xC1/(dC1)^3 > xC2/(dC2)^3$ is satisfied, the packing 1053C and the piston. 1052C are prevented from being separated from each other.

Furthermore, the endoscope conduit switching device (suction button 10) according to the above-described embodiment adopts a structure of switching the connection state of the plurality of conduits 6 by the two step pressing operation. However, this should not be construed in a limiting sense, and a structure enabling execution of the one step pressing operation only may be adopted.

In the embodiment described above. The endoscope system 1 has both the function of generating an ultrasound image and the function of generating an endoscopic image. However, this should not be construed in a limiting sense, and a configuration only having the function of generating an ultrasound image may be adopted.

The endoscope system 1 according to the embodiment described above is not limited to the medical field, and may also be an endoscope system used in an industrial field for observing the inside of a subject such as a mechanical structure.

The disclosure can provide an endoscope conduit switching device in which separation between a piston made of resin and an elastic packing is prevented.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A conduit switching device for use with an endoscope, the conduit switching device comprising:
 a first piston configured to be detachably inserted into a conduit of the endoscope, the first piston comprising:
  a first portion having a first outer circumferential surface, and
  a second portion provided distally relative to the first portion, and the second portion being thinner in a direction perpendicular to a longitudinal direction than the first portion, the second portion having a second outer circumferential surface, and
 a packing provided on at least a portion of the first outer circumferential surface and on the second outer circumferential surface;
 wherein the packing including an extending surface extending distally relative to a distal most end of the second portion, and
 the packing having a first diameter and a second diameter that is larger than the first diameter, and the second diameter is provided at the extending surface of the packing.

2. The conduit switching device according to claim 1, wherein
 the first piston has a columnar shape with a diameter differing between the first portion and the second portion, and
 the second portion satisfies $x1/(d1)^3 > x2/(d2)^3$, where x1 represents a length from a most proximal end side portion of the second portion to a distal end of the first piston in a direction along the conduit, x2 represents a length of the first piston in the direction along the conduit, d1 represents a diameter of the second portion, and d2 represents a diameter of the first portion.

3. The conduit switching device according to claim 1, wherein the first piston is configured to switch between a first state, a second state and a third state, wherein
 in the first state, the first piston connects a first suction conduit and an outside,
 in the second state, the first piston connects the first suction conduit and a second suction conduit provided in the endoscope, and
 in the third state, the first piston connects the first suction conduit and a third suction conduit provided in the endoscope.

4. The conduit switching device according to claim 1, further comprising:
 an attachment in which the first piston is inserted, the attachment configured to be detachable attached to the endoscope;

a second piston fixed to the first piston, the second piston configured to move relative to the attachment;

a shaft inserted into the second piston, and configured to move relative to the attachment;

a cap fixed to a proximal end side of the shaft, the cap configured to:
  receive an operation force; and
  transmit the operation force to the first piston;

a first coil spring configured to bias the second piston and the cap in directions away from each other; and a second coil spring configured to bias the attachment and the second piston in directions away from each other;

wherein the packing is configured to seal a gap between the conduit of the endoscope and the first piston detachably inserted in the conduit.

5. The conduit switching device according to claim 4, wherein the first piston is configured to switch between a first state, a second state and a third state;

between the first state and the second state, the shaft is configured to move with respect to the first piston and the second piston in response to an operation on the cap, and between the second state and the third state, the shaft is configured to move with respect to the attachment together with the first piston and the second piston in response to an operation on the cap.

6. An endoscope comprising:
an insertion portion configured to be inserted into a subject;
an operating portion provided on a proximal end side of the insertion portion; and
the operating portion comprises the switching device according to claim 1;
wherein the first portion and the second portion are made of resin material and the packing is made of an elastic material different from the resin material.

7. The endoscope according to claim 6, wherein the endoscope body is an ultrasound endoscope including an ultrasound probe in the insertion portion.

8. The conduit switching device according to claim 1, wherein the first piston further includes a third portion provided distally relative to the second portion, the third portion being thicker in the direction perpendicular to the longitudinal direction than the second portion, and the third portion having a third outer circumferential surface, and the packing is further provided on at least all portions of the third outer circumferential surface of the third portion including the third circumferential surface corresponding to a distal most end of the third portion.

9. The conduit switching device according to claim 8, wherein the extending surface extends distally relative to a distal end of the third portion.

10. The conduit switching device according to claim 1, further comprising:
a piston body provided proximally relative to the first portion, the piston body being adjacent to the first portion and having a third outer circumferential surface larger than the first outer circumferential surface of the first portion, and the third outer circumferential surface is not covered by the packing.

11. The conduit switching device according to claim 8, wherein a distal end of the first piston is exposed from a distal end of the packing.

12. The conduit switching device according to claim 1, wherein the first portion has a first length in a longitudinal axis of the first piston,
the second portion has a second length in the longitudinal axis, and
the first length is longer than the second length.

13. The conduit switching device according to claim 1, wherein the packing does not cover portions of the first piston proximally relative to the first portion and adjacent to the first portion.

14. The conduit switching device according to claim 1, wherein the first diameter is a smallest diameter of the first piston in portions of the first piston located proximally relative to the second portion that are covered by the packing.

15. The conduit switching device according to claim 1, wherein the extending surface of the packing having the second diameter is provided distally relative to the distal most end of the second portion.

16. The conduit switching device according to claim 15, wherein the extending surface of the packing having the first diameter is provided distally relative to the distal most end of the second portion.

17. The conduit switching device according to claim 1, wherein
the first piston further includes a third portion provided distally relative to the second portion; and
the extending surface of the packing extending distally relative to a distal end of the third portion.

18. The conduit switching device according to claim 17, wherein the packing further covers a distal face of the third portion.

19. The conduit switching device according to claim 17, wherein at least a portion of the extending surface of the packing having the second diameter extending distally relative to the distal end of the third portion.

20. The conduit switching device according to claim 1, further comprising a piston body provided proximally relative to the first portion, the piston body directly connecting to the first portion and having a third outer circumferential surface larger than the first outer circumferential surface of the first portion, and the third outer circumferential surface is not covered by the packing.

* * * * *